United States Patent
Safrani et al.

(10) Patent No.: US 10,190,867 B2
(45) Date of Patent: Jan. 29, 2019

(54) REAL TIME DUAL MODE FULL-FIELD OPTICAL COHERENCE MICROSCOPY WITH FULL RANGE IMAGING

(71) Applicant: B. G. NEGEV TECHNOLOGIES AND APPLICATIONS LTD., AT BEN-GURION UNIVERSITY, Beer Sheva (IL)

(72) Inventors: Avner Safrani, Kibbutz Ein Dor (IL); Ibrahim Abdulhalim, Wahat-Alsalam-Neve Shalom (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 175 days.

(21) Appl. No.: 15/118,877

(22) PCT Filed: Feb. 3, 2015

(86) PCT No.: PCT/IL2015/050115
§ 371 (c)(1),
(2) Date: Aug. 13, 2016

(87) PCT Pub. No.: WO2015/121853
PCT Pub. Date: Aug. 20, 2015

(65) Prior Publication Data
US 2017/0059299 A1 Mar. 2, 2017

Related U.S. Application Data

(60) Provisional application No. 61/939,336, filed on Feb. 13, 2014.

(51) Int. Cl.
G02B 21/00 (2006.01)
G01B 9/02 (2006.01)
(Continued)

(52) U.S. Cl.
CPC ..... G01B 9/02081 (2013.01); G01B 9/02091 (2013.01); G02B 21/0056 (2013.01);
(Continued)

(58) Field of Classification Search
CPC .... G02B 21/14; G02B 21/06; G02B 21/0092; G02B 21/16; G02B 21/367;
(Continued)

(56) References Cited

U.S. PATENT DOCUMENTS 8,072,610 B1   12/2011  Schmit et al.
2004/0070767 A1  4/2004  Tobiason et al.
(Continued)

FOREIGN PATENT DOCUMENTS

WO   2013/160890 A1   10/2013

OTHER PUBLICATIONS

International Search Report for PCT/IL2015/050115, dated Jun. 8, 2015.
(Continued)

*Primary Examiner* — William R Alexander
*Assistant Examiner* — Tamara Y Washington
(74) *Attorney, Agent, or Firm* — FisherBroyles, LLP; Robert Kinberg

(57) ABSTRACT

The invention is a system and method that enable obtaining ultra-high resolution interference, phase and OCT images at high speed. The system uses neither mechanical moving elements nor any optical/electro optical modulating means for obtaining the OCT images. Two OCT operating modes are available: for ultra-high resolution the system allows either spatial coherence TD-FF-OCT or temporal coherence TD-FF-OCT imaging, whereas for high resolution and ultra-high speed the system allows FD-FF-OCT imaging with full range imaging. In the TD mode, the OCT enface images are obtained in real time. In the FD mode, the 2D complex
(Continued)

signal is reconstructed in real time. In both cases the method has the advantage of very high speed imaging with great immunity to noise.

14 Claims, 15 Drawing Sheets

(51) Int. Cl.
    *G02B 27/10* (2006.01)
    *G02B 21/22* (2006.01)
    *G02B 21/26* (2006.01)

(52) U.S. Cl.
    CPC ......... *G02B 21/0092* (2013.01); *G02B 21/22* (2013.01); *G02B 21/26* (2013.01); *G02B 27/10* (2013.01); *G01B 2290/70* (2013.01)

(58) Field of Classification Search
    CPC ............ G02B 21/0032; G02B 21/0076; G02B 27/283; G02B 27/58; G02B 21/0068; G02B 21/00; G02B 21/0088; G02B 27/106
    USPC .................................................. 359/368–372
    See application file for complete search history.

(56) References Cited

U.S. PATENT DOCUMENTS

| | | |
|---|---|---|
| 2005/0099682 A1 | 5/2005 | Lauer |
| 2010/0309476 A1 | 12/2010 | Millerd |
| 2012/0133937 A1 | 5/2012 | Heintzmann et al. |

OTHER PUBLICATIONS

Written Opinion for PCT/IL2015/050115, dated Jun. 8, 2015.
Huang, D. et al., "Optical Coherence Tomography", Science, Nov. 22, 1991; 254(5035): 1178-1181.
Tomlins, P.H. et al., "Theory, developments and applications of optical coherence tomography," J. Phys. D: Appl. Phys. 38 (2005) 2519-2535.
Fercher, A.F, et al., "Measurement of intraocular distances by backscattering spectral interferometry", Opt. Commun., 117 (1995) 43-48.
Lexer, F. et al., "Wavelength-tuning interferometry of intraocular distances", Applied Optics, 36(25) Sep. 1, 1997, 6548-6553.
Leitgeb, R. et al., "Performance of fourier domain vs. time domain optical coherence tomography", Optics Express, 11(8), Apr. 21, 2003, 889-894.
De Boer, J.F. et al., "Improved signal-to-noise ratio in spectral-domain compared with time-domain optical coherence tomography", Optics Letters, 28(21), Nov. 1, 2003, 2067-2069.
Choma, M. et al., "Sensitivity advantage of swept source and Fourier domain optical coherence tomography", Optics Express, 11(18), Sep. 8, 2003, 2183-2189.
Drexler, W. et al., "In vivo ultrahigh-resolution optical coherence tomography", Optics Letters, 24(17), Sep. 1, 1999, 1221-1223.
Povazay, B. et al., "Submicrometer axial resolution optical coherence tomography", Optics Letters, 27(20), Oct. 15, 2002, 1800-1802.
Beaurepaire, E. et al., "Full-field optical coherence microscopy," Optics Letters, 23(4), Feb. 15, 1998, 244-246.
Vabre, L. et al., "Thermal-light full-field optical coherence tomography", Optics Letters, 27(7), Apr. 1, 2002, 530-532.
Dubois, A. et al., "Ultrahigh-resolution full-field optical coherence tomography", Applied Optics, 43(14), May 10, 2004, 2674-2883.
Považay, B. et al., "Full-field time-encoded frequency-domain optical coherence tomography", Optics Express, 14(7), Aug. 21, 2006, 7661-7669.
Dubey, S. K. et al., "Fingerprint detection using full-field swept-source optical coherence tomography", Applied Physics Letters, 91, 2007, 1811006-1-181106-3.
Dubey, S. K. et al., "Simultaneous topography and tomography of latent fingerprints using full-field swept-source optical coherence tomography", Journal of Optics A: Pure and Applied Optics, 10 (2008) 015307.
Bonin, T. et al., "In vivo Fourier-domain full-field OCT of the human retina with 1.5 million A-lines/s", Optics Letters, 35(20), Oct. 15, 2010, 3432-3434.
Watanabe, Y. et al., "Three-dimensional wide-field optical coherence tomography using an ultrahigh-speed CMOS camera", Optics Communications 281 (2008) 1889-1895.
Dubois, A. et al., "High-resolution full-field optical coherence tomography with a Linnik microscope", Applied Optics, 41(4), Feb. 1, 2002, 805-812.
Akira, M. et al., "Full-field optical coherence tomography by two-dimensional heterodyne detection with a pair of CCD cameras", Optics Letters, 28(10), May 15, 2003, 816-818.
Moneron, G. et al., "Stroboscopic ultrahigh-resolution full-field optical coherence tomography technique in eye imaging", Optics Letters, 30(11), Jun. 1, 2005, 1351-1353.
Wojtkowski, M. et al., "Full range complex spectral optical coherence tomography", Optics Letters, 27(16), Aug. 15, 2002, 1415-1417.
Targowski, P. et al., "Complex spectral OCT in human eye imaging in vivo", Optics Communications, 229 (2004) 79-84.
Leitgeb, R.A. et al., "Phase-shifting algorithm to achieve high-speed long-depth-range probing by frequency-domain optical coherence tomography", Optics Letters, 28(22), Nov. 15, 2003, 2201-2203.
Yun, S.H. et al., "Removing the depth-degeneracy in optical frequency domain imaging with frequency shifting", Optics Express, 12(20), Oct. 4, 2004, 4822-4828.
Bachmann, A.H. et al., "Heterodyne Fourier domain optical coherence tomography for full range probing with high axial resolution", Optics Express, 14(4), Feb. 20, 2006, 1487-1496.
Yasuno, Y. et al., "One-shot-phase-shifting Fourier domain optical coherence tomography by reference wavefront tilting", Optics Express, 12(25), Dec. 13, 2004, 6148-6191.
Sarunic, M. V. et al., "Instantaneous complex conjugate resolved spectral domain and swept-source OCT using 3×3 fiber couplers", Optics Express, 13(3), Feb. 7, 2005, 957-967.
Vakoc, B. J. et al., "Elimination of depth degeneracy in optical frequency-domain imaging through polarization-based optical demodulation", Optics Letters, 31(3), Feb. 1, 2006, 362-364.
Vakhtin, A.B. et al., "Resolving the complex conjugate ambiguity in Fourier-domain OCT by harmonic lock-in detection of the spectral interferogram", Optics Letters, 31(9), May 1, 2006, 1271-1273.
Yasuno, Y. et al., "Simultaneous B—M-mode scanning method for real-time full-range Fourier domain optical coherence tomography", Applied Optics, 45(8), Mar. 10, 2006, 1861-1865.
Wanga, R.K., "In vivo full range complex Fourier domain optical coherence tomography", Applied Physics Letters, 90, 54103 (2007).
Baumann, B. et al., "Full range complex spectral domain optical coherence tomography without additional phase shifters", Optics Express, 15(20), Oct. 1, 2007, 3375-13387.
Leitgeb, R.A. et al., "Complex ambiguity-free Fourier domain optical coherence tomography through transverse scanning", Optics Letters, 32(23), Dec. 1, 2007, 3453-3455.
Vergnole, S. et al., "Artifact removal in Fourier-domain optical coherence tomography with a piezoelectric fiber stretcher", Optics Letters, 3(7), Apr. 1, 2008, 732-734.
Hofer, B. et al., "Dispersion encoded full range frequency domain optical coherence tomography", Optics Express, 17(1), Jan. 5, 2009, 7-24.
Dhalla, A. et al., "Complex conjugate resolved heterodyne swept source optical coherence tomography using coherence revival", Biomedical Optics Express, 3(3), Mar. 1, 2012, 633-649.
Davidson, M. et al., "An application of interference microscopy to integrated circuit inspection and metrology," SPIE vol. 775 Integrated Circuit Metrology, Inspection, and Process Control, SPIE 775, 233-247 (1987).

(56) References Cited

OTHER PUBLICATIONS

Kino, G.S. et al., "Mirau correlation microscope," Applied Optics, 29(26), Sep. 10, 1990, 3775-3783.
Gale, D. et al., "Linnik microscope imaging of integrated circuit structures," Applied Optics, 35(1), Jan. 1, 1996, 131-148.
Kinoshita, M. et al., "Optical frequency-domain imaging microprofilometry with a frequency-tunable liquid-crystal Fabry—Perot etalon device", Applied Optics, 38(4), Dec. 1, 1999, 7063-7068.
De Groot, P. et al., "Signal modeling for low-coherence height-scanning interference microscopy," Applied Optics, 43(25), Sep. 1, 2004, 4821-4830.
Safrani, A. et al., "Ultrahigh-resolution full-field optical coherence tomography using spatial coherence gating and quasi-monochromatic illumination", Optics Letters, 37(4), Feb. 15, 2012, 458-460.
Suja Helen, S. et al., "A chromatic phase shifting by a rotating polarizer", Optics Communications 154, Sep. 15, 1998, 249-254.

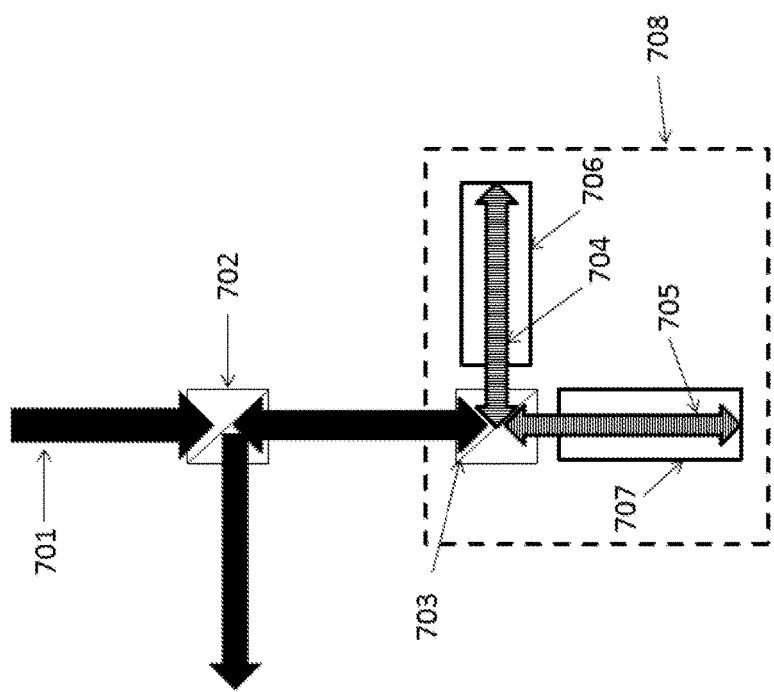

REAL TIME DUAL MODE FULL-FIELD OPTICAL COHERENCE MICROSCOPY WITH FULL RANGE IMAGING

FIELD OF THE INVENTION

The invention is from the field of optical imaging. In particular the invention is from the field of real time high resolution three dimensional imaging.

BACKGROUND OF THE INVENTION

Publications and other reference materials referred to herein are numerically referenced in the following text and respectively grouped in the appended Bibliography which immediately precedes the claims.

Optical coherence tomography (OCT) is a 3D imaging method that is mainly associated with the production of high resolution 3D images of multilayer semi transparent samples. This method was first demonstrated in the context of ophthalmology [1]. OCT development and application to the biomedical and biological optical imaging fields is rising every day. OCT relies on the light temporal coherence, interference and matter reflectivity (refraction index discontinuity) which are used to measure micro morphology of objects in a turbid environment [2]. Most OCT systems can be categorized into two main groups, time domain (TD) [1] and frequency domain (FD) OCT [3, 4]. The FD-OCT is a more recent technique for 3D imaging. This method has several advantages over its TD counterpart; the most prominent advantages are its high speed and improved signal to noise ratio (SNR) [5-7].

In the time domain OCT (TD-OCT) mode, an incoherent light source is used to illuminate the sample. The observed sample is placed at the focal plane of one of the interferometer objective lens, whereas the second objective is focused onto a reference mirror. In order to obtain the depth morphology of the sample, the reference mirror is scanned along the axis of the objective lens and through its depth of field (DOF). For each microstructure of the sample a strong interference peak is generated when the optical path between the reference mirror and the microstructure is zero. In order to obtain the entire 3D sample structure, the objective lens of the sample is scanned along the lateral dimension of the sample; for each lateral coordinate the depth information is extracted by actuating the reference mirror, as described above. TD-OCT was demonstrated with ultra-high axial resolution [8-9]; however, since the objective lenses are required to have large depth of field, the lateral resolution obtained is usually not very high; a disadvantage which is not apparent in full field OCT (FF-OCT) [10-12].

In the frequency domain OCT (FD-OCT) mode, the sample is either illuminated by a wavelength tunable source which is swept along the wavelength range (SS-OCT) [4] or by a broad band source (Spectral Domain OCT, SD-OCT) [3]. In both cases, the reference mirror is placed exactly at the focal plane while the sample objective lens is focused onto the sample top surface. In the SS-OCT mode, the light source of the system is swept and for each wavelength the interference signal is recorded at different time slots. Then, by applying the inverse Fourier transform (IFT) to the stored data the depth morphology of the sample is revealed. In the SD-OCT modality, the sample is illuminated by a broadband spectral source and the interference signal is recorded using a spectrometer. Then, by applying the IFT operation to the recorded spectra the sample depth morphology is revealed. Both in SS-OCT and in SD-OCT, in order to obtain the 3D sample structure, the sample must be scanned along the lateral dimension; a disadvantage which is not apparent in full field FD-OCT (FD-FF-OCT) [13-16]. In conventional FD and TD OCT systems, the lateral scanning is time consuming and requires that the interferometer (or sample) is completely stable; a fact which might be problematic in many applications.

Among all of the OCT techniques [17], the full field OCT (FF-OCT) technique is the only one that does not requires any lateral scanning. In this method the entire field of view of the sample is imaged onto a parallel detector (CCD/CMOS) and an interference 2D image is recorded simultaneously; which allows ultra-high speed enface OCT imaging [16, 18]. In the full field TD-OCT (TD-FF-OCT) mode, the observed sample is placed exactly at the focal plane of one of the objective lenses. The reference objective is focused onto the reference mirror. Then, by actuating the reference mirror just about the focal plane and over $2\pi$ radians of the phase difference, usually four phase shifted images are grabbed in four different time slots [19-20]. By a simple combination of these phase shifted images, the OCT en-face images are obtained at high speed (video rate). In order to obtain the entire 3D image, the sample is moved one step toward the sample objective lens and the above process repeats itself. By repeating this process for as many depth sections as are needed, the entire sample 3D structure is revealed. The TD-FF-OCT usually uses high numerical aperture objectives as it does not require large depth of field for the imaging. This fact, including the fact that no lateral scanning is involved, instills the method microscopic properties and therefore it is often referred to as optical coherence microscopy (OCM), instead of OCT. The high lateral resolution and the avoidance of lateral scanning are beneficial in some applications. However, as the phase shifted interference images are acquired in different time slots, the interferometer microscope must be kept completely stable; a fact which might be very problematic for some applications. Also, as each en-face OCT image requires four (at least three) phase shifted images, which are grabbed in different times, the imaging speed is not brought to its full potential. Several studies were published on TD-FF-OCT using few parallel detectors [21-22].

In a similar manner to the conventional TD-OCT, the FF-OCT has also an equivalent in the frequency domain mode; the full field Fourier domain OCT (FD-FF-OCT) [13]. In the FD-FF-OCT mode, the illumination is provided by a wavelength tunable light source; either a tunable filter or tunable laser. The observed sample is placed at the focal plane of one of the sample's objective lens of the interferometer such that its top surface is coincident with the focal plane of the objective. The reference mirror is positioned right at the focal plane of the second objective lens of the interferometer. The sample and reference reflected fields are interfered and an interference image is projected onto a parallel detector. For each wavelength an interference image is recorded. Then, by applying the IFT operation to each pixel the 3D morphology of the structure is obtained. The FD-FF-OCT is the only method among the OCT methods which does not require any form of scanning, neither axial nor lateral. As such, this method has very low mechanical noise and can be designed to have ultra-high 3D imaging speed by choosing high speed cameras together with fast swept tunable filter or tunable light source [16].

However, despite the fact that FD-OCT has very high speed and higher SNR when compared to TD-OCT, it also suffers from some drawbacks. The FD-FF-OCT is not exceptional in this manner and like all FD-OCT techniques it also suffers from the following drawbacks: (1) As the FD interference signal is basically a train of raised cosines (real and even function), the IFT operation results in a completely symmetrical image by which each sample structure is identified by two equivalent impulses. The impulses are located in symmetry on both sides of the zero delay line (focal plane). Therefore, the obtained depth images are obscured and cannot be easily interpreted. (2) Due to the high coherence length of each spectral line, the IFT images contain a parasitic noise which originates from the sample internal reflections. (3) To avoid mirror images obscuration, only half of the depth of field of the objective is used for imaging, typically in these cases the imaging range is not brought to its full potential. In the past, several researchers have tackled these problems in different ways. The first work to approach this problem used a SD-OCT system and a piezoelectric transducer at the reference arm by which five phase shifted signals were grabbed in different time slots [23]. Then, by simple combination of these signals, the full range FD-OCT images were obtained without significant mirror images, as well as reduced DC and coherent noise. This method was also demonstrated in-vivo on the human eye [24], and later was improved by using only two phase shifted signals [25]. In the following years researchers consistently tried to develop better techniques for obtaining clear FD-OCT images with full range imaging. These included methods using acousto-optic modulator (AOM) [26-27], tilted reference mirror modulation [28], 3×3 fiber coupler which delivers 3 phase shifted interference signals [29], polarization demodulation using a fiber Mach-Zehnder interferometer [30], lock-in technique with a single detector and a monochromator [31], a method called BM mode [32] which required the mechanical modulation of the reference mirror, a lateral Hilbert transform [33], demodulation through lateral scanning together with lateral Hilbert [34] and Fourier [35] transforms, piezoelectric fiber stretch demodulation [36], an iterative dispersive encoded full range algorithm [37] and also a method using an optical delay line [38]. However none of the above methods is suitable for the full field OCT configuration and, to the best knowledge of the inventors, was not employed in the past by any means.

It is a purpose of the present invention to provide an OCT method and system in which the phase shifted images are grabbed simultaneously and therefore does not require a highly quiet environment.

It is another purpose of the present invention to provide an OCT method and system that provides at least a three-fold faster or more imaging speed than previously proposed methods and systems.

It is another purpose of the present invention to provide an OCT method and system in which the optical setups, as well as the algorithms, are completely different from those disclosed in previously proposed methods and systems.

It is another purpose of the present invention to provide an OCT method and system that overcomes the problems that have previously arisen using the FF-OCT imaging modality.

Further purposes and advantages of this invention will appear as the description proceeds.

SUMMARY OF THE INVENTION

The invention is an interference microscopy 3D imaging system comprising:
a. an illumination unit 1700, which provides light to the system;
b. a frequency domain triggering unit 1800, which accepts a small portion of the light from illumination unit 1700 and allows triggering of detectors in a frequency domain operating mode;
c. a two beam orthogonally polarized interferometer, which is illuminated by light from illumination unit 1700 and;
d. a detection unit comprising:
   i. a tube lens;
   ii. at least three 50/50 non-polarizing beam splitters;
   iii. at least two analyzers;
   iv. at least two parallel detectors; and
   v. at least one precision achromatic wave plate chosen from at least one of the following types of wave plates: compensating, half wave, and quarter wave; and
e. a motorized stage on which the sample is mounted, the motorized stage connected to and controlled by a processing unit.

The system of the invention allows at least two full field achromatic phase shifted interference signals to be captured simultaneously and processed to yield an amplitude signal and a phase signal thereby allowing ultra-high speed, accurate 3D imaging with great immunity to vibrational and intensity noise.

In an embodiment of the system of the invention detection unit 2000 comprises:
   i. a tube lens 18;
   ii. a first 50/50 non-polarizing beam splitter 19, a second 50/50 non-polarizing beam splitter 20 and a third 50/50 non-polarizing beam splitter 21 by which the interferometer output beam is split and manipulated in space;
   iii. a precision achromatic compensating wave plate 22 aligned with its optic axis parallel to the S or P waves emerging from the interferometer;
   iv. a precision achromatic quarter wave plate 28 aligned with its optic axis parallel to the S or P waves emerging from the interferometer;
   v. a precision achromatic half wave plate 25 aligned with its optic axis parallel to the S or P waves emerging from the interferometer;
   vi. three analyzers 29, 23 and 26 positioned after the wave plates 22, 28 and 25 at 45° with respect to the S and P waves; and
   vii. three parallel detectors 24, 30 and 27 used to detect the interference images.

In embodiments of the previous embodiment the light emerging from the illumination unit is quasi-monochromatic, the plates 22, 25 and 28 are not-achromatic, the parallel detectors 24, 30, 27 are single pixel detectors and the phase extracted is fed into a motion control to dynamically monitor the position of a moving stage carrying a sample.

In an embodiment of the system of the invention the detection unit comprises:
   i. a precision achromatic quarter wave plate 33 aligned with its optic axes at 45° with respect to the S and P waves emerging from the interferometer;
   ii. a tube lens 18;
   iii. a first 50/50 non-polarizing beam splitter 19, a second 50/50 non-polarizing beam splitter 20 and a third 50/50 non-polarizing beam splitter 21 by which the interferometer output beam is split and manipulated in space;
   iv. three analyzers 23, 29 and 26 positioned at 0°, 45°, and 90° with respect to the S and P waves emerging from the interferometer; and v. three parallel detectors 24, 30, and 27 positioned after the analyzers 23, 29, and 26 and used to detect the interference images.

In embodiments of the previous embodiment the light emerging from the illumination unit is quasi-monochromatic, the plate 33 is not-achromatic, the parallel detectors 24, 30, 27 are single pixel detectors and the phase extracted is fed into a motion control to dynamically monitor the position of a moving stage carrying a sample.

In an embodiment of the system of the invention the detection unit comprises:
i. a tube lens 18;
ii. a first 50/50 non-polarizing beam splitter 19, a second 50/50 non-polarizing beam splitter 20 and a third 50/50 non-polarizing beam splitter 21 by which the interferometer output beam is split and manipulated in space;
iii. a precision achromatic quarter wave plate 28 aligned with its optic axis parallel to the S or P waves emerging from the interferometer;
iv. a precision achromatic half wave plate 25 aligned with its optic axis parallel to the S or P waves emerging from the interferometer;
v. two analyzers 29 and 26 positioned after the wave plates 22 and 25 at 45° with respect to the S and P waves; and
vi. two parallel detectors 30 and 27 used to detect the interference images.

In embodiments of the previous embodiment the light emerging from the illumination unit is quasi-monochromatic, the plates 25 and 28 are not-achromatic, the parallel detectors 27 and 30 are single pixel detectors and the phase extracted is fed into a motion control to dynamically monitor the position of a moving stage carrying a sample.

In an embodiment of the system of the invention the detection unit comprises:
i. a precision achromatic quarter wave plate 33 aligned with its optic axes at 45° with respect to the S and P waves emerging from the interferometer;
ii. a tube lens 18;
iii. a first 50/50 non-polarizing beam splitter 19, a second 50/50 non-polarizing beam splitter 20 and a third 50/50 non-polarizing beam splitter 21 by which the interferometer output beam is split and manipulated in space;
iv. two analyzers 29 and 26 positioned at 45° and 90° with respect to the S and P waves emerging from the interferometer; and
v. two parallel detectors 30, and 27 positioned after the analyzers 29 and 26 and used to detect the interference images.

In embodiments of the previous embodiment the light emerging from the illumination unit is quasi-monochromatic, the plate 33 is not-achromatic, the parallel detectors 27 and 30 are single pixel detectors and the phase extracted is fed into a motion control to dynamically monitor the position of a moving stage carrying a sample.

In embodiments of the system of the invention the illumination unit comprises at least one of the following elements: a tunable light source, a non-tunable light source, a diffuser, a condensing lens, a field stop, a projecting lens, a polarizer, a tunable filter, and a non-polarizing beam splitter. In these embodiments the light source can be one of: a laser, laser configured to allow wavelength sweeping, a light emitting diode, a white light source, and a non-tunable light source with an integrated tunable filter.

In embodiments of the system of the invention the two beam orthogonally polarized interferometer has the configuration of one of the following interferometer types: Linnik, Michelson, Twyman-Green, Fizau, Nomarski and Mirau.

In embodiments of the system of the invention the light polarization from the illumination unit is controlled to be oriented so that the light beam arrives at the sample arm of the polarization interferometer but at least partially not at the reference arm to allow optimum contrast and multimodal microscopy operation.

In embodiments of the system of the invention the amplitude signal is used to bring the focus plane onto the surface of one particular layer of a thick multilayered sample while the phase signal is used to map the surface of that particular layer.

In embodiments of the system of the invention the introduced interference phase shifts using the wave plates is $\beta$ rather than $\pi/2$ where $\pi m < \beta < \pi(m+1)$ and m is an integer.

All the above and other characteristics and advantages of the invention will be further understood through the following illustrative and non-limitative description of embodiments thereof, with reference to the appended drawings.

BRIEF DESCRIPTION OF THE DRAWINGS

FIG. 15 shows a setup for obtaining an orthogonally polarized two beam interferometer in non-common path configuration interferometers in which the illuminating light beam first passes through a nonpolarization beam splitter while the interferometer uses a polarizing beam splitter to generate the two orthogonally polarized beams.

DETAILED DESCRIPTION OF EMBODIMENTS OF THE INVENTION

The invention is a system and method that enable obtaining ultra-high resolution interference, phase and OCT images at high speed. The system uses neither mechanical moving elements nor any optical/electro optical modulating means for obtaining the OCT images. Two OCT operating modes are available: for ultra-high resolution the system allows either spatial coherence TD-FF-OCT or temporal coherence TD-FF-OCT imaging, whereas for high resolution and ultra-high speed the system allows FD-FF-OCT imaging with full range imaging. In the TD mode, the OCT enface images are obtained in real time. In the FD mode, the 2D complex signal is reconstructed in real time. In both cases the method has the advantage of very high speed imaging with great immunity to noise.

By using three (alternatively two) parallel detectors, each equipped with an achromatic phase shifter, three phase shifted (alternatively two) interference images are grabbed simultaneously and in parallel (the entire field of view is recorded at once). By using a simple three phase (or alternatively two phase) algorithm the OCT images are obtained at high speed. The method allows for TD-FF-OCT imaging as well as FD-FF-OCT imaging with full range. Although the method is described in the context of OCT it can very well be used for surface profiling and other 3D imaging applications, using both the phase and the amplitude of the interference signal, as in traditional interference optical microscopy systems [39-44]. In addition the method can be used for dynamically monitoring the position of a moving stage carrying a sample with high precision such as to help maintain the sample at the focal plane of an imaging system. In the latter case the three cameras can be replaced with photodiodes or any other fast detectors, made of single pixel or multiple pixels.

In another variation of the method the incident polarized light from the illumination unit 1700 is rotated, mechanically or electronically using an electrooptic or a magnetooptic modulator, so that the whole beam is forwarded towards the sample arm of the interferometer unit and nothing is transferred to the reference arm. This way a bright field imaging mode is produced and multimodal operation of the microscope system becomes possible such as fluorescence, dark field, and phase contrast, in addition to the 3D interference microscopy mode.

The invention will now be described in two parts. Firstly the system, the simulations and the experimental results using the systems will be described with respect to the figures and then the method of obtaining the results will be described.

DETAILED DESCRIPTION OF THE DRAWINGS

Figure 1:
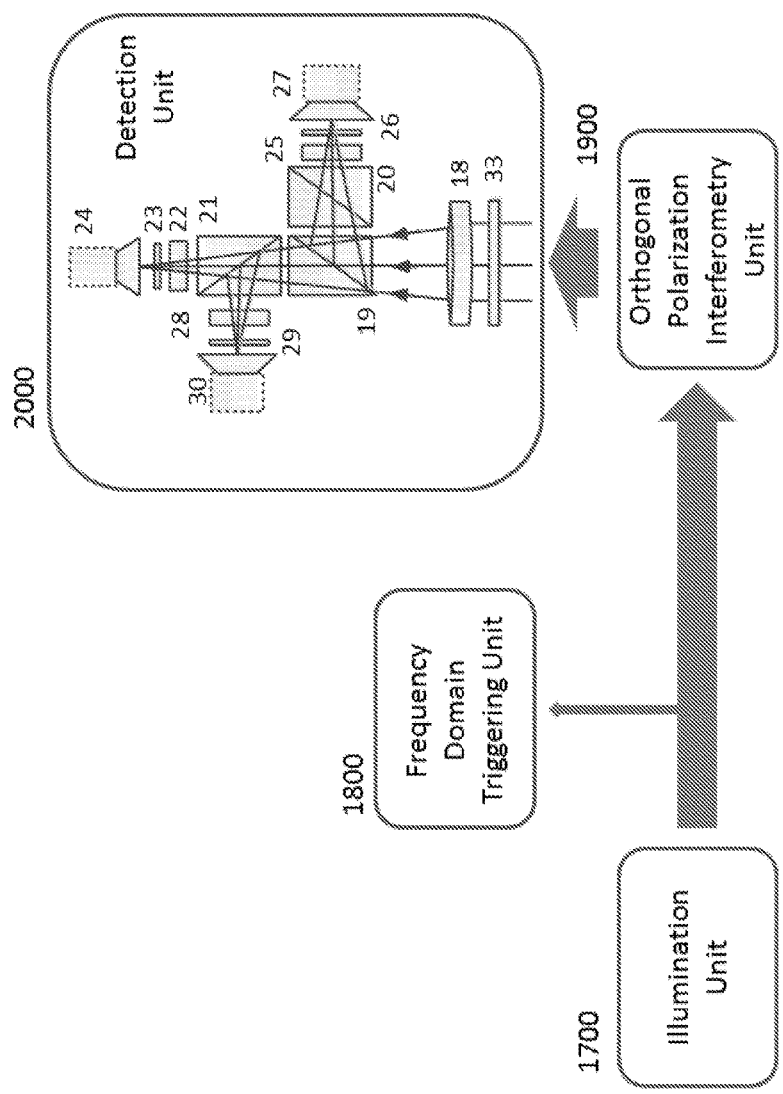
FIG. 1 is a schematic diagram of an embodiment of the general system of the invention composed of four main parts: an illumination unit, a frequency domain triggering unit, a double beam interferometer unit that uses two orthogonally polarized beams and a detection unit which uses parallel phase shifting imaging by utilizing two or three cameras and passive phase shifting optics.

FIG. 1: In FIG. 1 the general structure of a 3D optical microscope is depicted. The microscope comprises an illumination unit 1700 with Koehler illumination arrangement optics in some embodiments, a frequency domain triggering unit 1800, an orthogonal polarization interferometry unit 1900 which may be of any known-in-the-literature form such as Linnik, Michelson, Twyman-Green, Fizau, Nomarski and Mirau type interferometers, and a detection unit 2000. The output of the interferometry unit is composed of two combined beams with orthogonal polarization; one beam is reflected from a reference target and the second beam is reflected from the sample. The combined beam emerging from the interferometry unit enters the detection unit 2000 which includes imaging, splitting, polarizing, compensating and phase retardation components. The sample and reference beams have orthogonal polarization waves, i.e., S and P waves. The two waves are incident on a wave plate 33 aligned with its optic axis at 45° with respect to the S and P waves; the wave plate is preferably an achromatic precision QWP. The waves are then collected by the microscope tube lens 18. The tube lens has a large enough focal length so that the optical components within the imaging path do not have significant wavefront distortion effects. Elements 19, 20 and 21 are ordinary non-polarizing beam splitters with 50/50 splitting ratio for the reflection and transmission. Element 23, 26 and 29 are analyzers aligned at 45° to the S and P polarization planes; alternatively the analyzers can be rotated with 0°, 90° and 45°, respectively. The analyzers are used to project both polarization waves one on top the other and thereby allowing interference. Element 22 is a compensation precision achromatic wave plate (W) preferably with zero retardation, element 28 is a precision achromatic quarter wave plate (PQWP) and element 25 is a precision achromatic half wave plate (PHWP); alternatively wave plates 22, 25 and 28 produce zero phase delay or may be completely removed. The PQWP (element 28) optionally creates $\pi/2$ phase delay (retardation) between the two polarization waves from the reference and sample arms, while the PHWP (element 25) optionally causes a $\pi$ phase delay (retardation) between the reference and sample arms. Therefore, by using three parallel detectors 24, 27 and 30, three interference images with optionally $\pi/2$ phase delay are recorded at once; alternatively the phase delay between the three images is designed to be $2/3\pi$ even $\beta$ where $\beta$ is in the range $m\pi < \beta < \pi(m+1)$ and m is an integer. Optionally the parallel detector of the cameras is a charge coupled device (CCD); alternatively it is a complementary metal oxide semiconductor (CMOS) or an array of photodiodes. When the system is operated in the frequency domain mode, elements 24, 27 and 30 are optionally triggered by the frequency domain triggering unit. When the system is operated in the time domain mode, elements 24, 27 and 30 are optionally triggered by a common TTL source or even by means of software trigger which is typically provided by a personal computer (PC).

Figure 2:
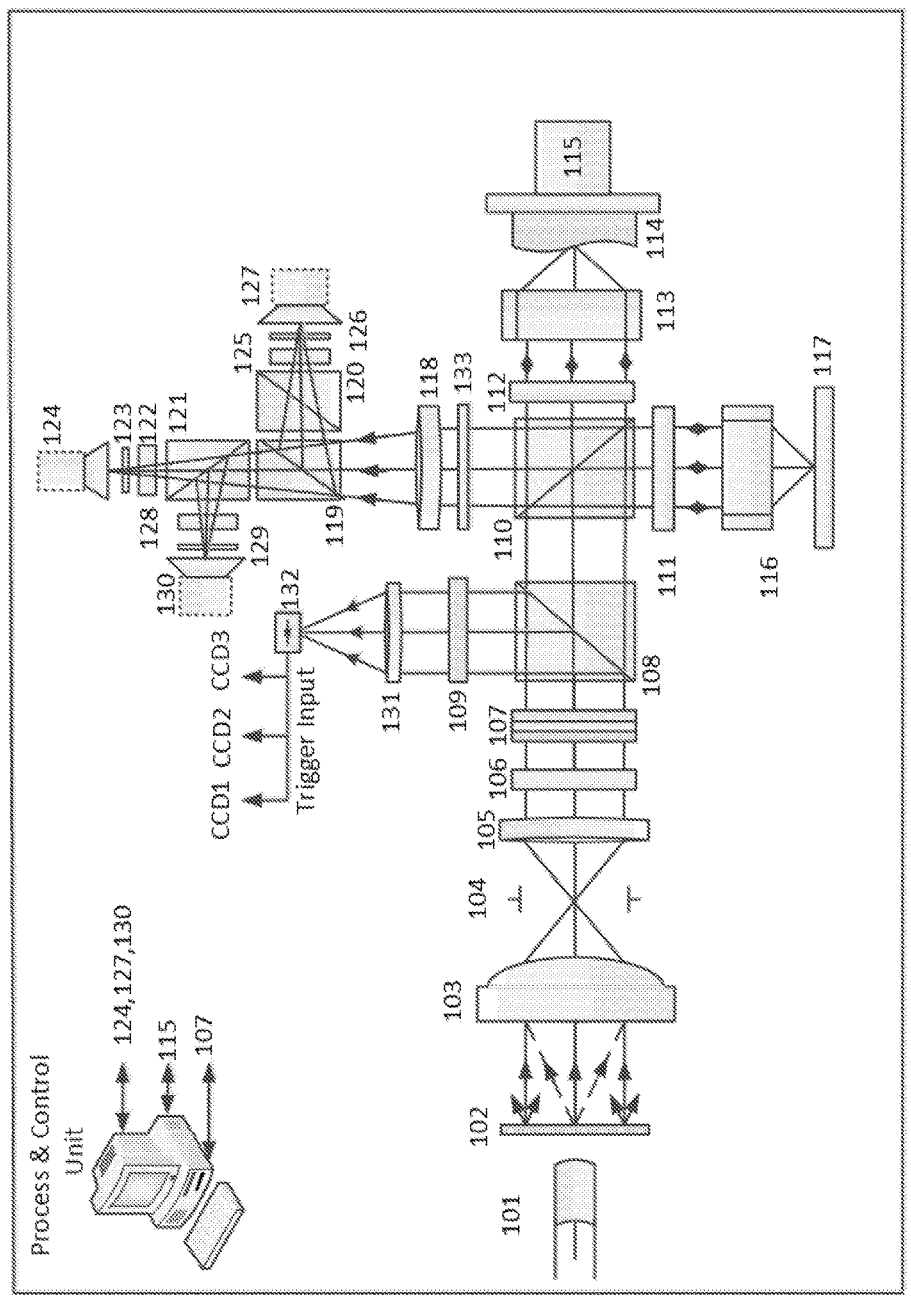
FIG. 2 is a schematic representation of one embodiment of the configuration of the microscopy system within the framework of a Linnik interference microscope.

FIG. 2: In FIG. 2 the Linnik like optical microscopy system is depicted. In one embodiment a halogen lamp is used as the thermal light source 101; alternatively the light source is a high power LED, a xenon arc lamp, or a tunable laser. The light emerging from the source is incident on a diffuser 102 followed by a condenser 103. A field stop (FS)

104 is positioned at the focal plane of a projecting lens 105. The FS is projected onto the back focal plane of the microscope objective lenses whereas the illumination coil (alternatively the LED/LD aperture or even the diffuser surface) is imaged onto the front focal plane of the objective lenses; therefore the microscope has the Kohler illumination arrangement. Element 106 is a polarizer and element 107 is a tunable filter (TF), in embodiments of the system the TF is a Fabry Perot liquid crystal tunable filter (FPLCTF), alternatively element 107 is an acousto-optic TF (AOTF) or any other narrowband tunable filter. The TF is optionally equipped with an optical band pass filter (BPF) with full width half maximum (FWHM) of 5 nm-400 nm. The BPF has any desirable central wavelength. The TF is preferably integrated into the light source of the system. The light emerging the TF is split by means of an optical beam splitter 108 with uneven splitting ratio such as 10/90 for the reflection and transmission, respectively. The transmitted beam is propagating into the Linnik interferometer which is constructed by a polarized beam splitter 110, two achromatic quarter wave plates (QWP) 111 and 112, two objective lenses 113 and 116, a reference mirror 117, a sample 114 and a motorized stage 115. The motorized stage may use a stepper motor, a servo or even a piezoelectric transducer. The objective lens numerical aperture (NA) may have any value. The QWPs are aligned with the fast axis at 45° with respect to the plane of polarization. After reflection from the sample and reference mirror, the two beams are recombined at the PBS 110. The sample and reference beams have orthogonal polarization waves. The two waves are optionally incident on a wave plate 133 aligned with its optic axis at 45° with respect to the S and P waves; the wave plate is optionally an achromatic precision QWP. The waves are then collected by the microscope tube lens 118. The tube lens has a large enough focal length so that the optical components within the imaging path do not have significant wavefront distortion effects. Elements 119, 120 and 121 are ordinary non-polarizing beam splitters with 50/50 splitting ratio for the reflection and transmission. Element 123, 126 and 129 are analyzers aligned with optionally 45° to the S and P polarization plains; alternatively the analyzers can be rotated with 0°, 90° and 45°, respectively. The analyzers are used to project both polarization waves one on top the other and thereby allowing interference. Element 122 is a precision achromatic wave plate (W) with optionally zero retardation, element 128 is a precision preferably achromatic quarter wave plate (PQWP) and element 125 is a precision preferably achromatic half wave plate (PHWP); alternatively wave plates 122, 125 and 128 produce zero phase delay or maybe removed. The PQWP optionally creates $\pi/2$ phase delay (retardation) between the two polarization waves from the reference and sample arms, while the PHWP optionally causes a $\pi$ phase delay (retardation) between the reference and sample arms. Therefore, by using three parallel detectors 124, 127 and 130, three interference images with optionally $\pi/2$ phase delay are recorded at once; alternatively the phase delay between the three images is designed to be $2/3\pi$ or even $\beta$ where $\beta$ is in the range $m\pi < \beta < \pi(m+1)$ and m is an integer. Optionally the parallel detector of the cameras is a charge coupled device (CCD); alternatively it is a complementary metal oxide semiconductor (CMOS) or an array of photodiodes. Element 109 is an air spaced or solid etalon which is designed in accordance with the frequency step required for the imaging when using the FD-FF-OCT mode. Element 131 is a collecting lens, element 132 is a photodiode with optionally wide bandwidth response. When the system is operated in the FD-FF-OCT mode, the beam propagating through the etalon is optionally used for accurately triggering the parallel detectors at each spectral line; alternatively the triggering is done by software means. Elements 107, 115, 124, 127 and 130 are all controlled by a process and control unit which is typically provided by a personal computer (PC).

The system in FIG. 2 can be operated in several modes. In the TD-FF-OCT mode using a spatial coherence gating, the TF is supplied with a certain voltage in accordance with the desired illumination wavelength. The sample 114 is brought into focus and the computer triggers the CCD/CMOS to capture an image. Three phase shifted images are thus obtained. Then, the sample is moved by means of 115 one step towards the objective lens and again the computer triggers the camera to grab an image. Thus, enface 2D interference images of different depth with optionally $\pi/2$ phase delay are grabbed. The 3D structure of the sample is constructed using these images. The 3D images can be reconstructed using only 1 parallel detector by using ordinary fringe analysis techniques. Alternatively, the 3D images can be reconstructed using a three step algorithm as will be described herein below. On the other hand, in the TD-FF-OCT mode using a temporal coherence gating, the TF is moved aside from the illumination path. In this case, the illumination is with wide bandwidth and hence has short temporal coherence gate. Here too, the observed sample is brought into focus and the computer triggers the cameras to grab 2D interference image. Then, by means of element 115 the sample is moved one step towards the objective lens and another 2D interference image is grabbed. Thus, enface 2D interference images of different depth with optionally $\pi/2$ phase delay are grabbed. The 3D structure of the sample is constructed using these images. The 3D images can be reconstructed using only 1 parallel detector by using fringe analysis techniques. Alternatively, the 3D images can be reconstructed using three step algorithm in accordance with the description of the method of the invention described herein below.

In the FD-FF-OCT mode, the TF is right in place. The TF wavelength is swept using a suitable periodic voltage signal. The TF thus changing its output wavelength in accordance with the instantaneous supplied voltage. The TF is supplied with voltage only after the sample was placed at the focal plane of the sample objective lens. The focal plane of the objective lens is positioned such that 3D sample structures are located from both sides of it. While sweeping the wavelength of the TF the cameras are triggered each time the output wavelength is matched with the etalon transmission wavelength. Thus, enface 2D interference images of different wavelengths and with $\pi/2$ phase delay are grabbed and stored in the computer. The 3D images are reconstructed using three step algorithm in accordance with the description of the method of the invention described herein below.

Figure 3:
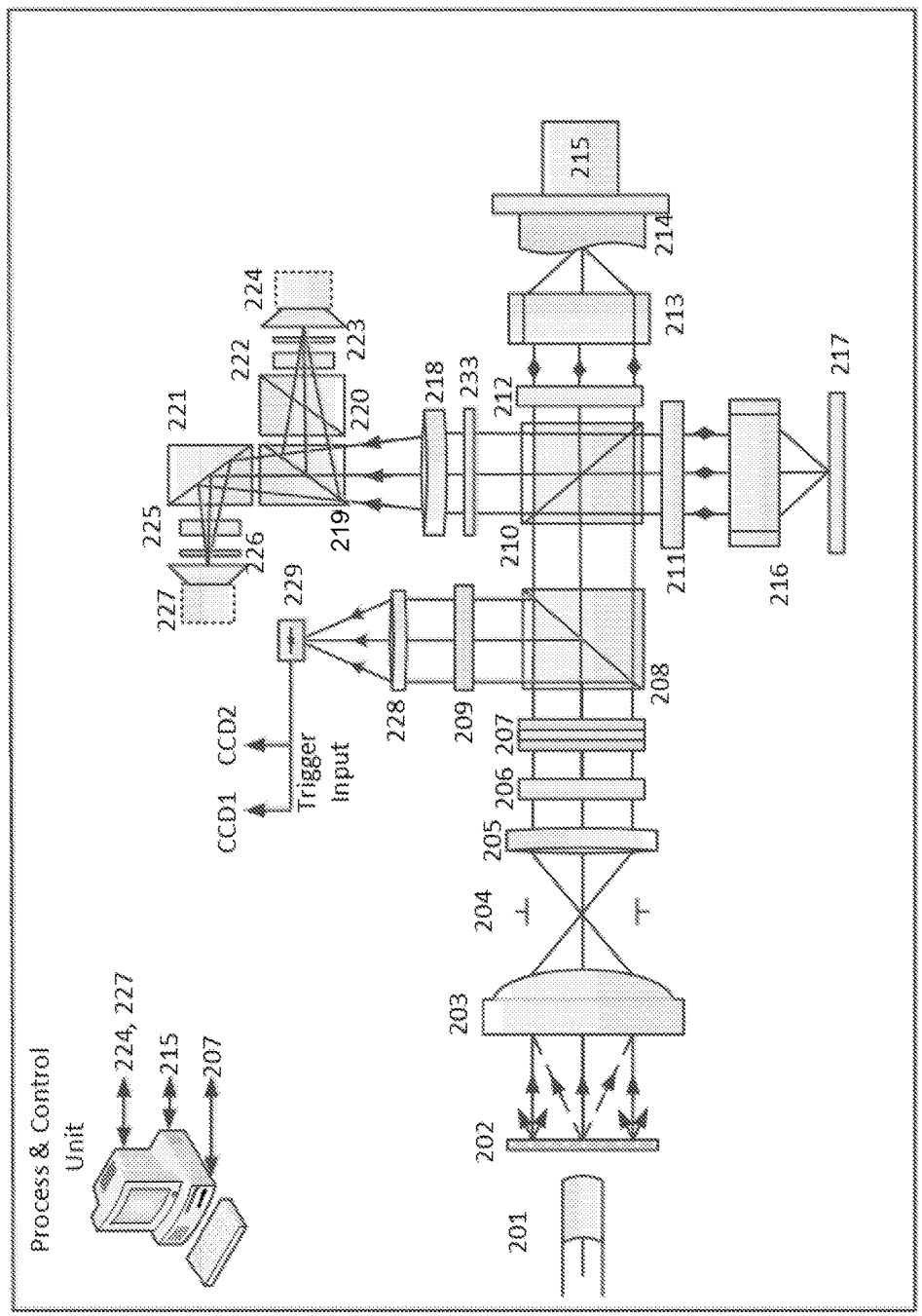
FIG. 3 is a schematic representation of a second embodiment of the configuration of the microscopy system within the frame work of a Linnik interference microscope.

FIG. 3: FIG. 3 shows another embodiment of the invention. In FIG. 3 the descriptions of elements 201-221 is completely identical and respective to the descriptions of elements 101-121 in FIG. 2. Generally speaking the system in FIG. 3 is almost the same as the system in FIG. 2; however it is operated with only two parallel detectors instead of three. In FIG. 3, element 222 is optionally an achromatic PQWP and element 225 is an optionally zero retardation wave plate (W); alternatively both wave pates are zero retardation wave plates. Elements 223 and 226 are analyzers aligned with optionally 45° to the S and P polarizations; alternatively element 223 is aligned with 0° while element 226 is aligned with 45° to the S and P directions. Element 233 is optionally an achromatic PQWP; alternatively it is zero retardation wave plate. Elements 224 and 227 are parallel detectors. Element 228 is a collecting lens and element 229 is an optionally wideband photodiode detector. Elements 207, 215, 224 and 227 are all connected and controlled by the process and control unit which is typically provided by a PC. The system in FIG. 3 can be operated in several modes. In the TD-FF-OCT mode using a spatial coherence gating, the TF is supplied with a certain voltage in accordance with the desired illumination wavelength. An image of only the reference mirror is stored at the computer for the specific illuminating wavelength. The sample is brought into focus and the computer triggers the CCD/CMOS to capture an image. Two phase shifted images are thus obtained. Then, the sample is moved by means 215 one step towards the objective lens and again the computer triggers the camera to grab an image. Thus, enface 2D interference images of different depth with optionally π/2 phase delay are grabbed. The 3D structure of the sample is constructed using these images. The 3D images can be reconstructed using only 1 parallel detector by using ordinary fringe analysis techniques. Alternatively, the 3D images can be reconstructed using two step algorithm in accordance with the description of the invention in the following section. On the other hand, in the TD-FF-OCT mode using a temporal coherence gating, the TF is removed from the illumination path. In this case, the illumination is with wide bandwidth and hence has short temporal coherence gate. Here too, the observed sample 214 is brought into focus and the computer triggers the cameras to grab 2D interference image. Then, by means of element 215 the sample is moved one step towards the objective lens and another 2D interference image is grabbed. Thus, enface 2D interference images of different depth with optionally π/2 phase delay are grabbed. The 3D structure of the sample is constructed using these images. The 3D images can be reconstructed using only 1 parallel detector by using fringe analysis techniques. Alternatively, the 3D images can be reconstructed using two steps algorithm in accordance with the description of the method of the invention herein below.

In the FD-FF-OCT mode, the TF is right in place. The TF wavelength is swept using a suitable supplied electronic signal. The TF thus changing its output wavelength in accordance with the instantaneous supplied voltage. The TF is supplied with voltage only after the sample was placed at the focal plane of the sample objective lens. The focal plane of the objective lens is positioned such that 3D sample structures are located from both sides of it. While sweeping the wavelength of the TF the cameras are triggered each time the output wavelength is matched with the etalon transmission wavelength. Thus, enface 2D interference images of different wavelengths and with optionally π/2 phase delay are grabbed and stored in the computer. The 3D images are reconstructed using two steps algorithm in accordance with the description of the method of the invention herein below.

Figure 4:
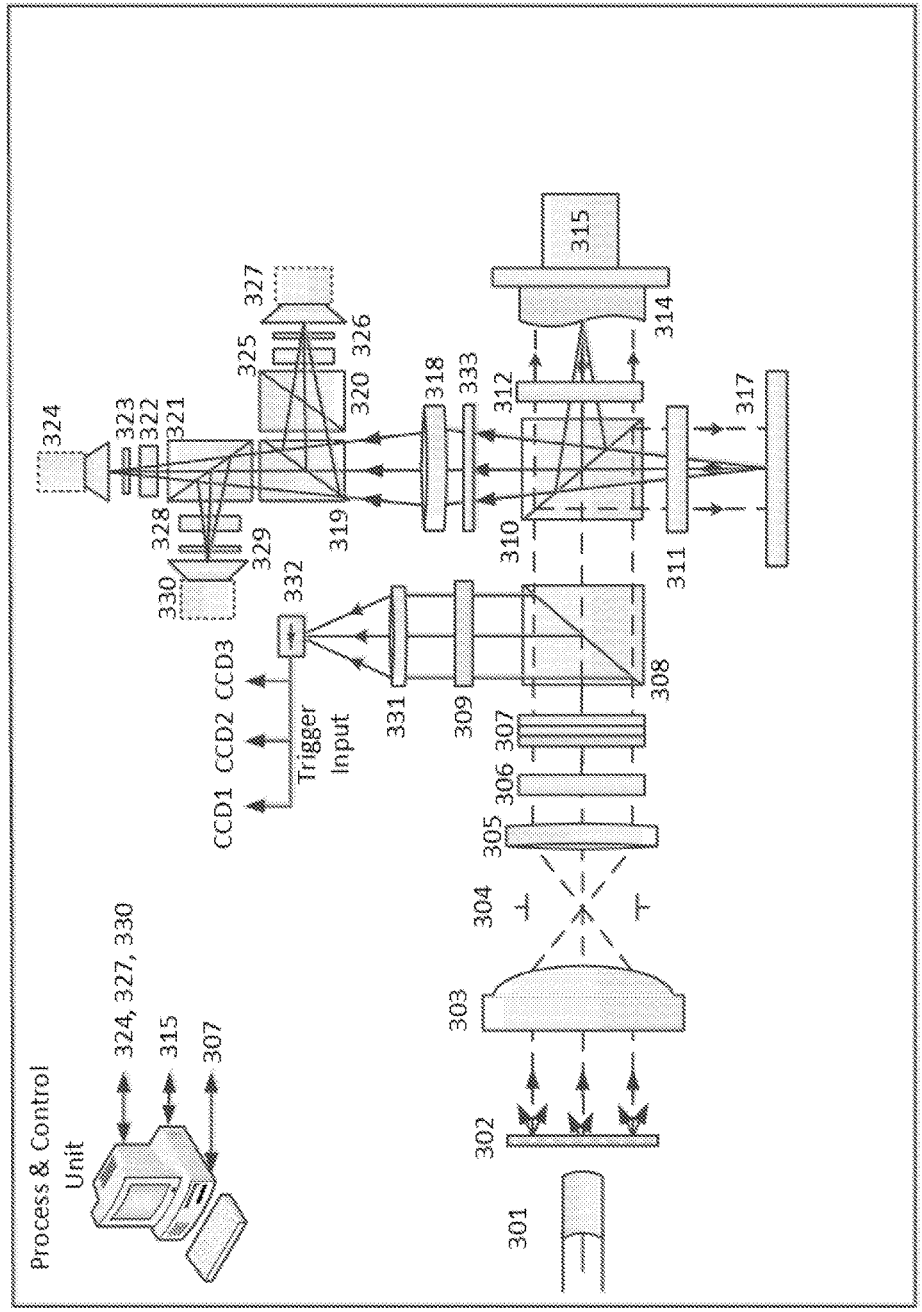
FIG. 4 is a schematic representation of one embodiment of the configuration of the microscopy system within the framework of a Twyman-Green/Michelson type interference microscope.

FIG. 4: FIG. 4 shows another embodiment of the invention using a Twyman-Green/Michelson type interference microscope, which is sometimes also referred to as a "Taylor interferometer". The system is almost entirely identical to the system described in FIG. 2 wherein the first digit of all the identifying numerals is respectively replaced with numeral 3. Also the description of the operating principles is very similar. There are minor differences which relate to the objective lenses exclusion and the fact that the tube lens may be with different focal length. The tube lens here may also be considered a compound lens system that includes a microscope objective with large working distance and a tube lens. In addition, the parallel detectors are optionally positioned at the image plane of the tube lens which is not necessarily coincident with the focal plane of the tube lens.

Figure 5:
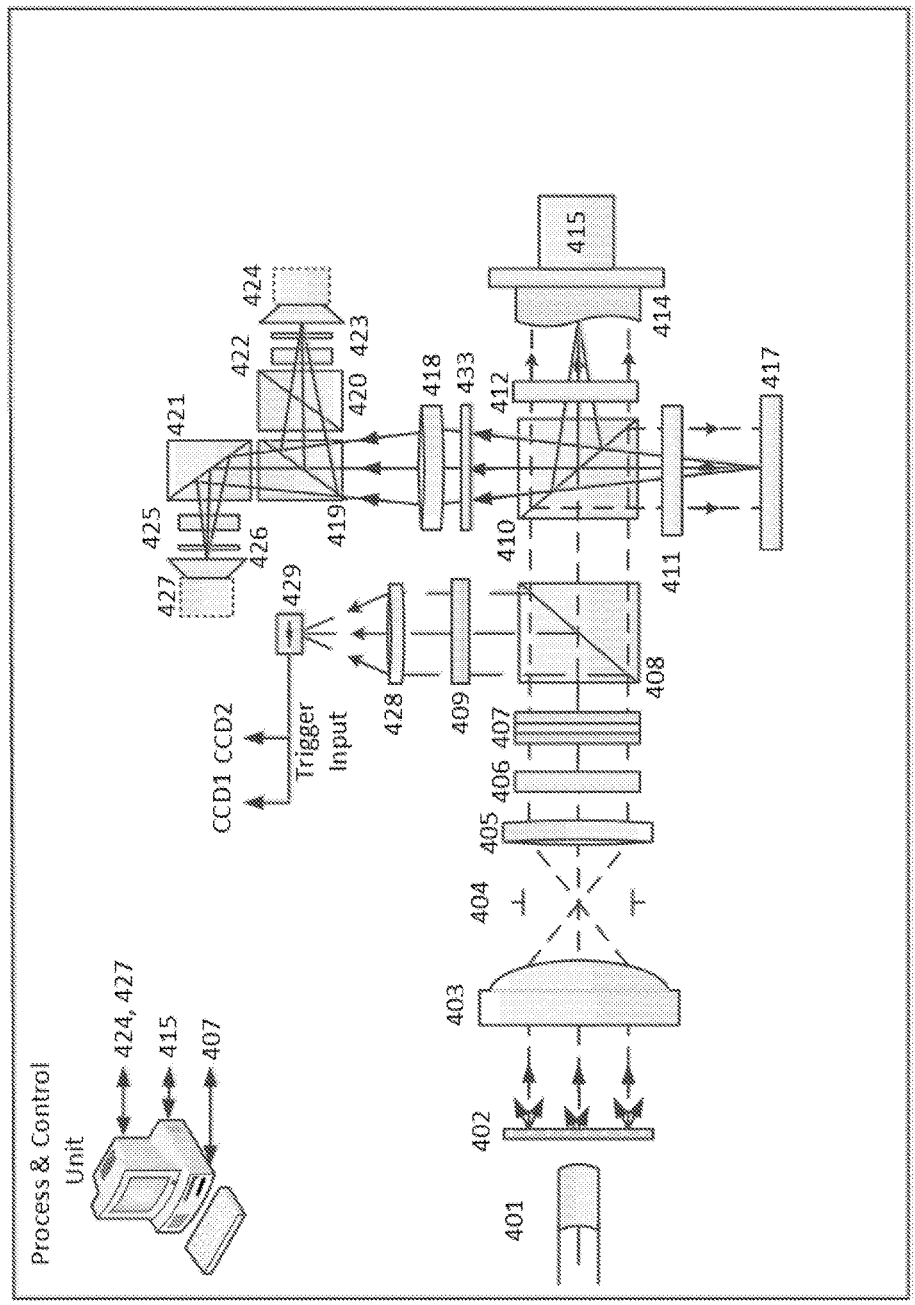
FIG. 5 is a schematic representation of a second embodiment of the configuration of the microscopy system within the framework of a Twyman-Green/Michelson type interference microscope.

FIG. 5: FIG. 5 shows another embodiment of the invention using a Twyman-Green/Michelson type interference microscope. The system is almost entirely identical to the system described in FIG. 3 wherein the first digit of all the identifying numerals is respectively replaced with numeral 4. Also the description of the operating principles is very similar. There are minor differences which relate to the objective lenses exclusion and the fact that the tube lens may have a different focal length. The tube lens here may also be considered a compound lens system that includes a microscope objective with large working distance and a tube lens. In addition, the parallel detectors are optionally positioned at the image plane of the tube lens which is not necessarily coincident with the focal plane of the tube lens.

Figure 6:
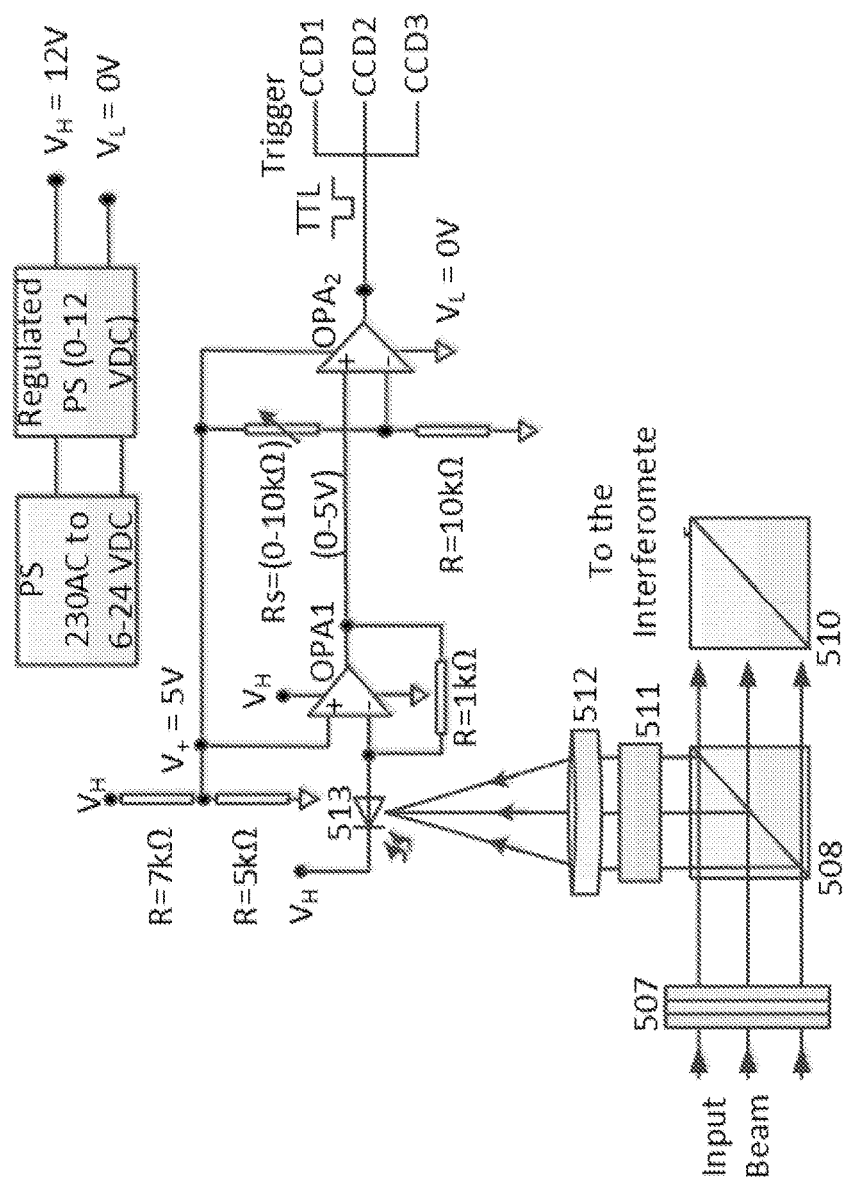
FIG. 6 is a schematic representation of the signal triggering method of the invention.

FIG. 6: FIG. 6 shows one optional embodiment of the triggering method used. A collimated input beam is propagating through an optionally in line tunable filter (TF) 507; alternatively the TF is the tunable source for the collimated beam. The light incident on the beam splitter (BS) 508 is split. Optionally the BS is an uneven BS with splitting ratio of 10/90 for the reflection and transmission, respectively. The transmitted light is used for illuminating the sample at the Linnik or Twyman-Green/Michelson interferometer. Element 510 is the polarized beam splitter used in the interferometer of the current invention. The light reflected at BS 508 propagates through an etalon 511. Optionally the etalon is an air spaced etalon; alternatively the etalon is a solid etalon. The etalon is designed to have a free spectral range (FSR) and Finesse (F) in accordance with frequency steps required by the microscope application. For example, an air spaced etalon with 555 GHz FSR and a Finesse of 10 designed to operate at a central wavelength of 735 nm can be used. Alternatively the FSR may be much smaller or greater and also the Finesse. The etalon allows only the supported wavelengths, e.g., the wavelength with optical frequency coincident with the etalon transmission lines, to be transmitted. When a supported frequency component is detected by the photodiode (PD) 513 a strong photo current is generated therein. The photocurrent is used to generate a time to live signal (TTL) which triggers the cameras. FIG. 6 shows one exemplary circuitry which allows detecting spectral lines even when the light source does not have a flat spectral shape. For example, if the light source has a Gaussian shape, the potentiometer (Rs) in FIG. 6, is used to set the threshold for which spectral lines with low intensity can still be detected and as a result generate a trigger signal.

Figure 7:
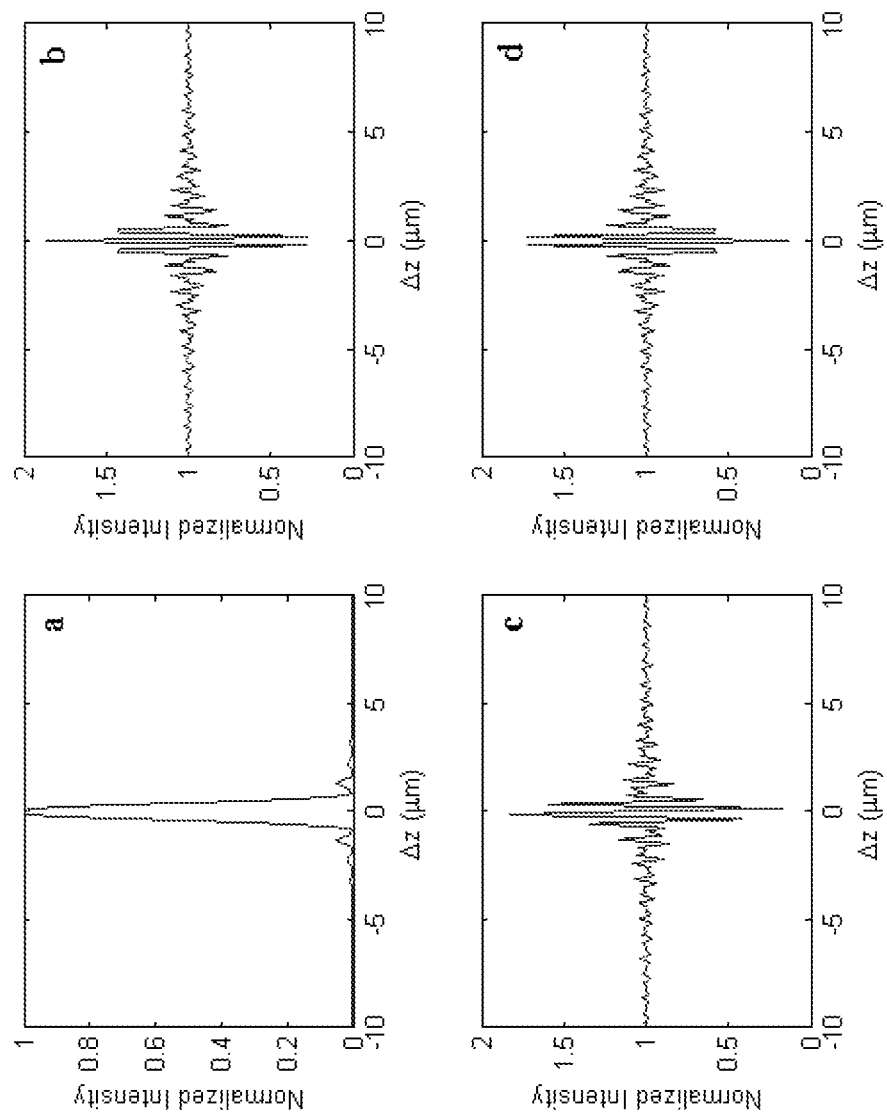
FIG. 7 shows simulation results of a single reflector scanned along the optical axis of the objective lens, using spatial coherent gating TD-FF-OCT imaging.

FIG. 7: FIG. 7 shows simulation results of the spatial coherence gate TD-FF-OCT signal and the three phase shifted interference signal generated at each camera at a single pixel. The simulation considers all the critical optical components specifications as provided by the manufacturer of all the critical optical elements in the system. The spatial coherence gate is obtained by using objective lens with 0.9 NA in air in the simulation. The following optical components specifications were considered in the simulation calculations: the BS reflectivity and transmission for each polarization wave, the retardations of the wave plates, the PBS reflection and transmission, the analyzers transmission and aligning errors, a LED light source with Gaussian spectrum and its nominal output power, a BPF with 10 nm FWHM and its transmission, different losses of light through field propagation at the optical lenses and free space and also the quantum efficiency of the camera. The simulated sample is a simple Silicon wafer. Specifically FIG. 7 shows a) The normalized spatial coherence gate TD-FF-OCT signal at each pixel and in linear scale, b) The interference signal with zero retardation, c) The interference signal with π/2 retardation and, d) The interference signal with π retardation.

Figure 8:
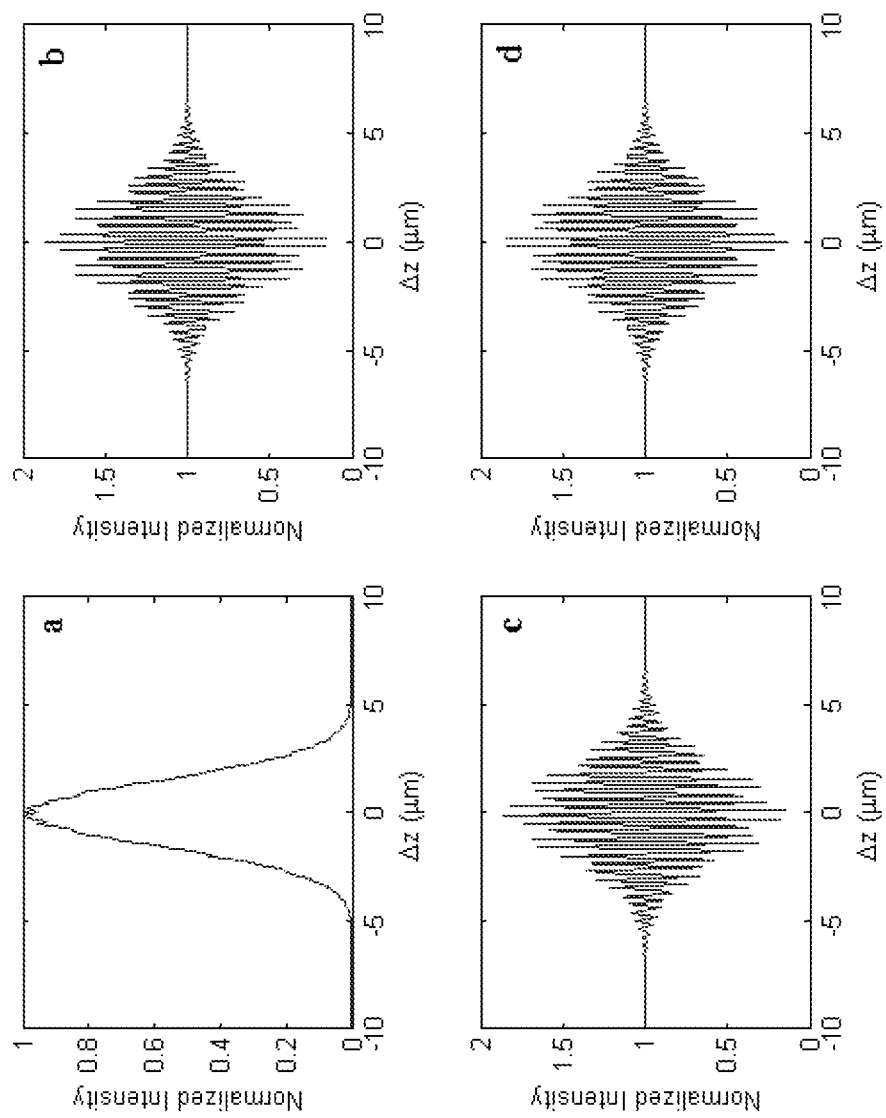
FIG. 8 shows simulation results of a single reflector scanned along the optical axis of the objective lens, using temporal coherent gating TD-FF-OCT imaging.

FIG. 8: FIG. 8 shows simulation results of the temporal coherence gate TD-FF-OCT signal and the three phase shifted interference signal generated at each camera at a single pixel. The simulation considers all the critical optical components specifications as provided by the manufacturer and by using objective lenses with 0.3 NA in air. The following optical components were considered: the BS reflectivity and transmission for each polarization wave, the retardations of the wave plates, the PBS reflection and transmission, the analyzers transmission and aligning errors, a LED light source with 60 nm FWHM Gaussian spectrum and its nominal output power, different losses of light through field propagation at the optical lenses and free space and also the quantum efficiency of the camera. The simulated sample is a simple Silicon wafer. Specifically FIG. 8 shows a) The normalized temporal coherence gate TD-FF-OCT signal at each pixel and in linear scale, b) The interference signal with zero retardation, c) The interference signal with π/2 retardation and, d) The interference signal with π retardation.

Figure 9:
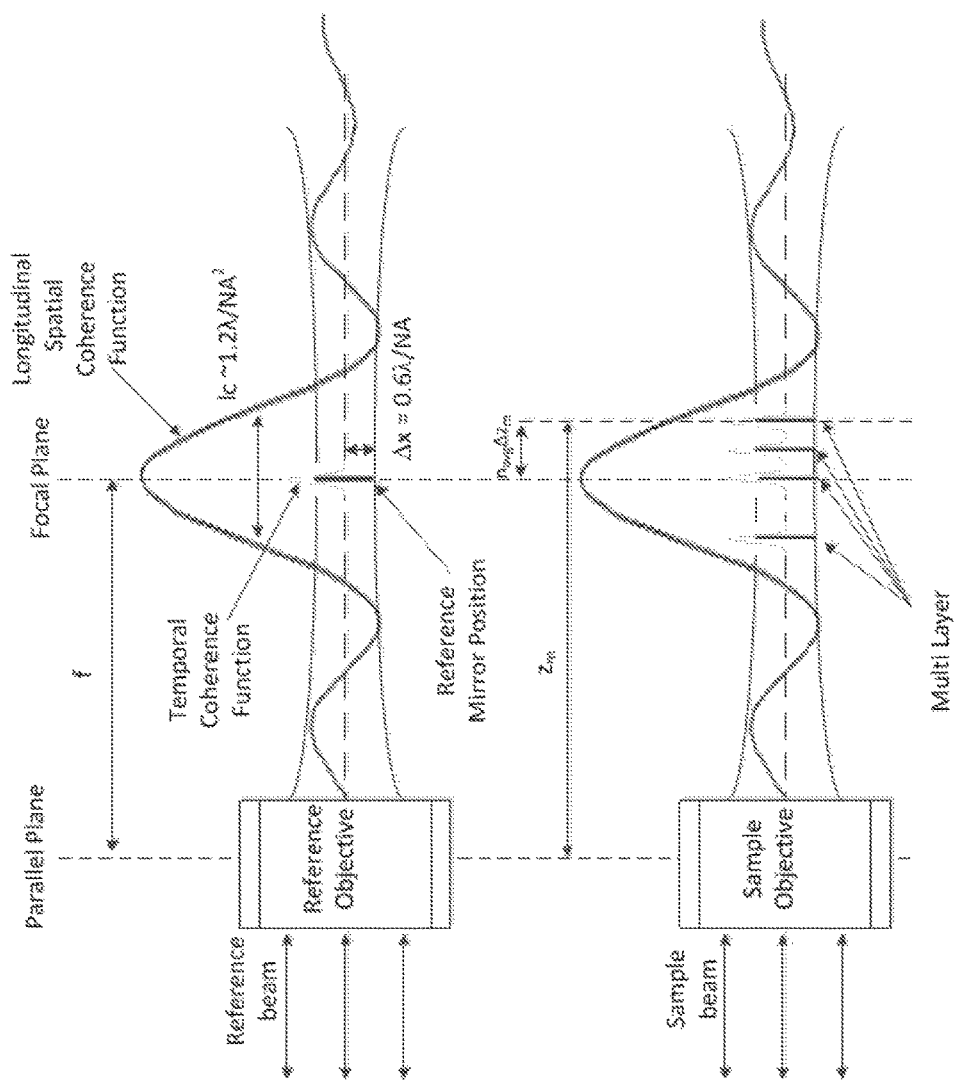
FIG. 9 shows the optical mutuality of the reference and objective beams and their focusing by the objective lenses, the reference mirror and the multilayer sample.

FIG. 9: FIG. 9 shows the optical mutuality of the objective lenses, the observed multilayer sample, the temporal and spatial coherence gates, the principal plane and the focal plane of the objective lenses when using low NA objectives. In FIG. 9 f is the focal length, $z_m$ is the optical path length measured from the principal plane to the location of the $m^{th}$ structure, $\Delta z_m$ thickness of the $m^{th}$ layer, $n_{avg}$ is the averaged refraction index, NA is the numerical aperture of the objective lens, λ is the wavelength, Δx is the diffraction resolution and $l_c$ is the longitudinal spatial coherence length.

Figure 10:
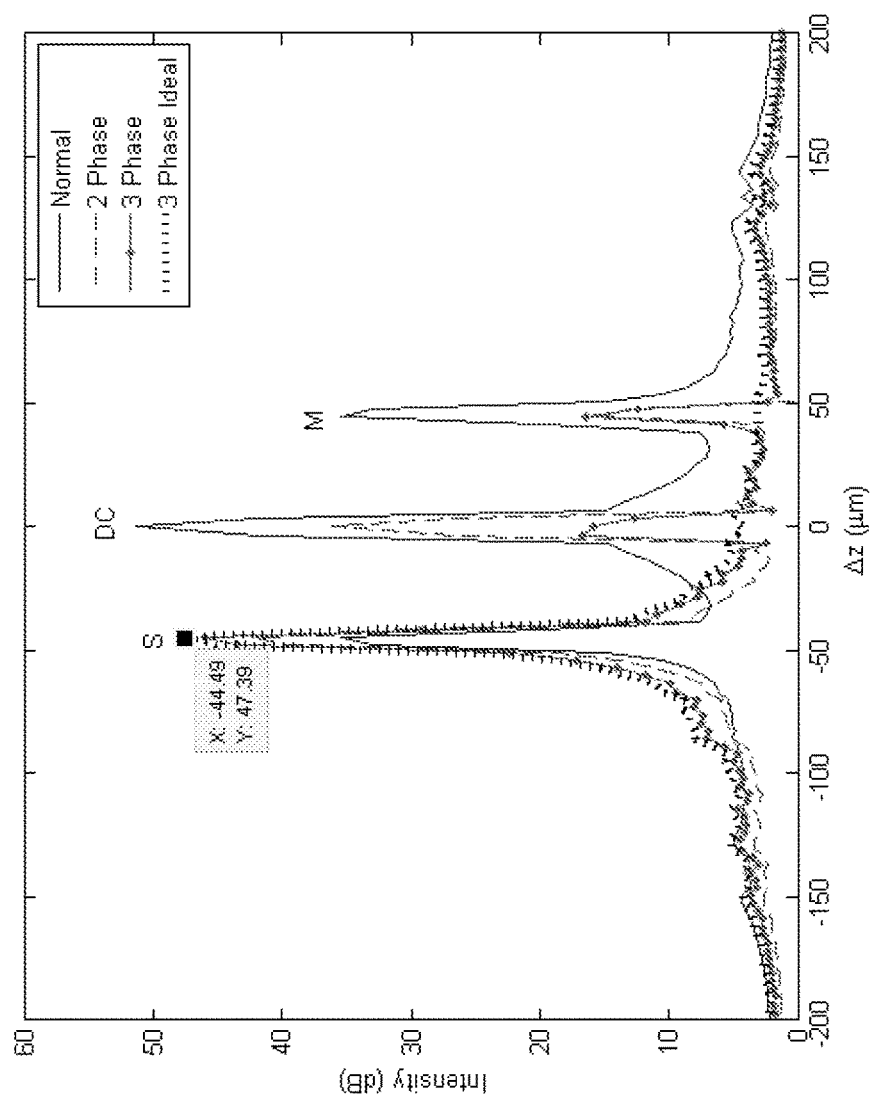
FIG. 10 shows a comparison between normal, 2 phase, 3 phase, and ideal 3 phase simulation results of a single reflector imaged at −45 μm in front of the focal plane using the full range FD-FF-OCT mode.

FIG. 10: FIG. 10 shows simulation results of the FD-FF-OCT signal obtained when imaging a single reflector positioned at −45 μm in front of the focal plane of the objective lens using different algorithms. The simulation shows how the FD-FF-OCT signal is obtained when using only one camera and without using the method provided in the invention, this plot is labeled 'Normal' and shown using a solid line. The simulation shows how the FD-FF-OCT signal is obtained when using two cameras in accordance with the method provided in the invention, this plot is labeled '2 Phase' and shown with a dashed line. The simulation shows how the FD-FF-OCT signal is obtained when using three cameras in accordance with another approach provided in the invention, this plot is labeled '3 Phase' and shown as a dotted line with the dots connected by solid lines. Finally, FIG. 9 also shows how the FD-FF-OCT signal is obtained when using three cameras in accordance with the method provided in the invention using ideal optical components, this plot is labeled '3 Phase Ideal' and is shown by a dotted line. The simulation considers all the critical optical components specifications as provided by the manufacturer using objective lenses with 0.1 NA in air. The following optical components non ideal specification were considered: the BS reflectivity and transmission for each polarization wave, the retardations of the wave plates, the PBS reflection and transmission, the analyzers transmission and aligning errors, a LED light source with 60 nm FWHM Gaussian spectrum and its nominal output power, different losses of light through field propagation at the optical lenses and free space and also the quantum efficiency of the camera. The simulated sample is a simple glass plate in air. The simulation shows that for normal FD-OCT imaging there is a mirror image (M) and DC (DC) noise which obscures the image and make it very difficult to decipher. The simulation shows that for ideal condition the mirror image and DC noise are completely eliminated leaving only the reflector signal (S) apparent. This image is very easy to decipher. For non-ideal condition it is shown that there is a very strong rejection of the DC and mirror images (~30 dB) but still there exist some residual noises. The residual DC and mirror signals are strongly attenuated and would be almost entirely invisible; demonstrating the effectiveness of the current invention.

Figure 11:
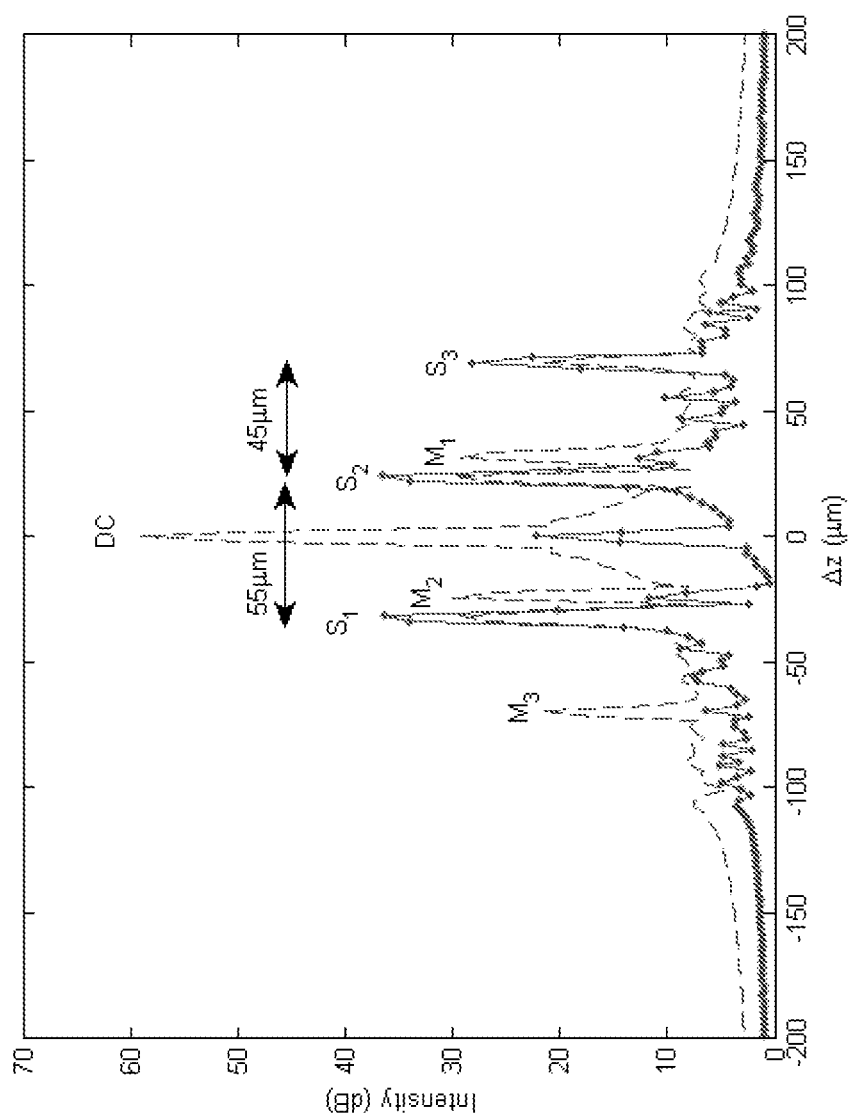
FIG. 11 shows a comparison between full range and non-full range (normal) simulation results of a multilayer with two layers having thicknesses of 55 μm and 45 μm using the full range and normal FD-FF-OCT mode with two phase algorithm.

FIG. 11: FIG. 11 shows simulation results of the FD-FF-OCT signal obtained when imaging a multilayer with two layers having thicknesses of 55 μm and 45 μm for the first and second layers, respectively. The multilayer is positioned such that part of it is in front of the focal plane of the objective lens and another part of it is behind the focal plane of the objective lens. The simulation shows how the FD-FF-OCT signal is obtained when using only one camera (dashed line) and without using the method described in the invention. The simulation also shows how the FD-FF-OCT signal is obtained when using two cameras in accordance with the method provided in the invention; plotted in solid line. It is shown that in the first case of normal FD-OCT, the DC noise as well as the mirror image and the coherent noise signals are very apparent. Whereas, in the second case, when using one of the approaches of the current invention, the mirror image and DC noise are strongly attenuated; allowing easier interpretation of the sample at hand. Using a better BS with more accurate splitting ratio will significantly improve this result. Also, in the case of using three cameras in accordance with the description of the invention, the obtained signal is improved and the mirror images, as well as the DC and autocorrelation noises, are further reduced. The simulation considers all the critical optical components specifications as provided by the manufacturer using objective lens with 0.1 NA in air. The following optical components specification were considered: the BS reflectivity and transmission for each polarization wave, the retardations of the wave plates, the PBS reflection and transmission, the analyzers transmission and aligning errors, a LED light source with 60 nm FWHM Gaussian spectrum and its nominal output power, different losses of light through field propagation at the optical lenses and free space and also the quantum efficiency of the camera.

Figure 12:
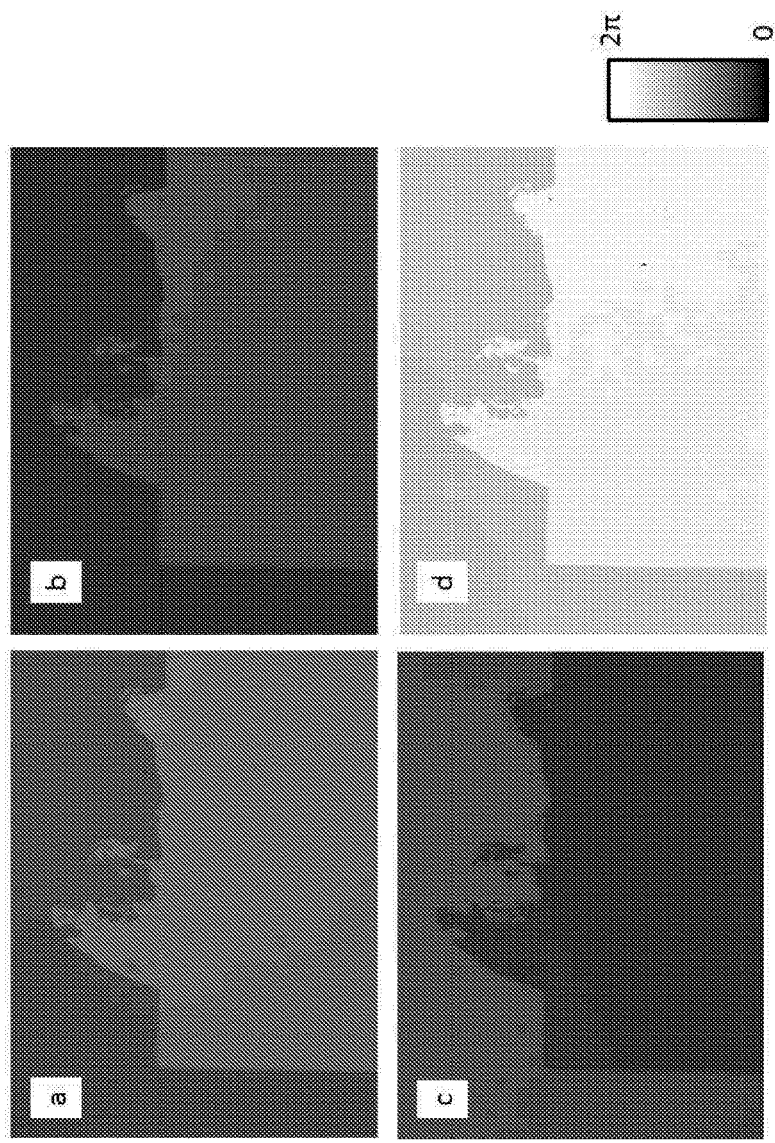
FIG. 12 shows a typical experimental result of the enface interference image obtained in each one of the parallel detectors and the extracted phase image when imaging a Silicon step sample.

FIG. 12: FIG. 12 shows an experimental measurement of surface topography of an etched Silicon wafer with square corner pattern. In FIGS. 12a-12c the enface interference signals from CCD1-CCD3, respectively, are depicted; it is evident that the three images are phase shifted. In FIG. 12d the phase image is presented; the phase image is obtained using the 3 phase shift algorithm described herein below.

Figure 13:
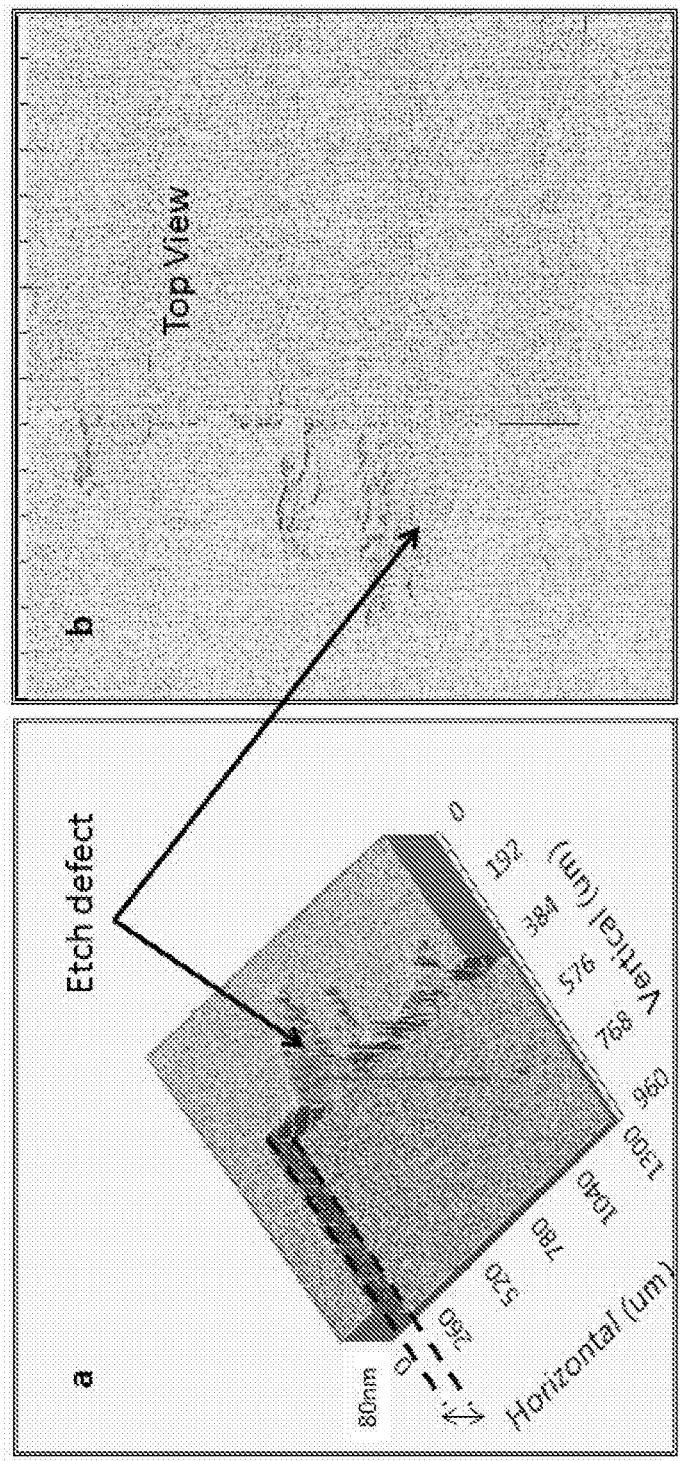
FIG. 13 shows the 3D reconstructed topography of the sample in FIG. 12.

FIG. 13: In FIG. 13a the 3D image of the sample from FIG. 12 is presented. The 3D image is drawn using FIG. 12d and the phase-space relation as described herein below. FIG. 13b shows the top view of FIG. 13a.

Figure 14:
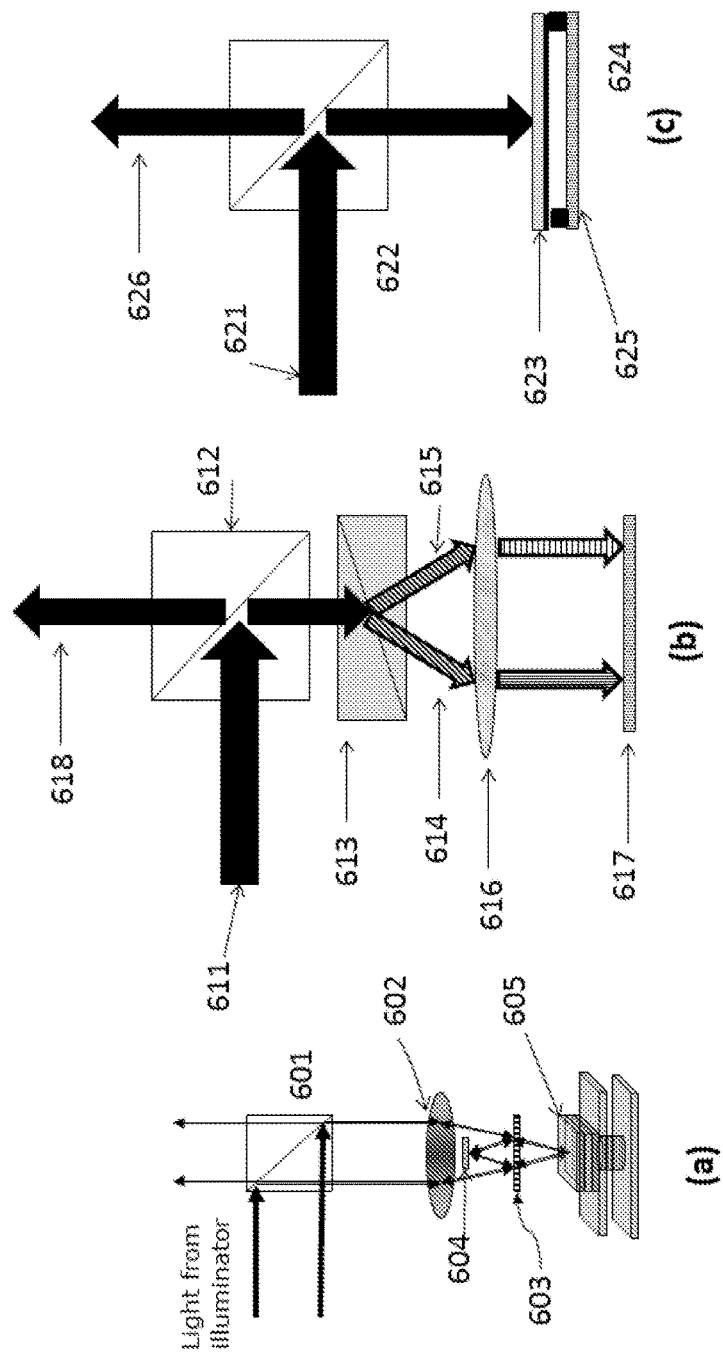
FIG. 14 shows a scheme for alternative embodiments of interferometers that use orthogonally polarized beams: (a) modified Mirau type objective with a flat polarized beam splitter replacing the beam splitter of the non-polarized Mirau objective; (b) Nomarski type interferometer; (c) Orthogonally polarized Fizau interferometer.

FIG. 14: In FIG. 14 other alternatives for orthogonally polarized interferometer units are depicted that can replace unit 7 of FIG. 1 or the Linnik and Twyman-Green interferometers in FIGS. 2-5. FIG. 14a is a modified Mirau type objective with the internal flat beam splitter (FBS) replaced with a flat polarized beam splitter (FPBS) such as wire grid polarizer or a stack of QWP/FBS/QWP. In the latter case the beam preferably linearly polarized and oriented at 45 degrees to the QWP optic axis. The light coming from the illuminator is linearly polarized directed with an ordinary non-polarizing beam splitter 601 towards the modified Mirau objective lens system 602, hits the FPBS 603, splits into TE polarized beam towards the reference mirror 4 and into TM polarized beam towards the sample 605. The two beams then recombine upon reflection and continue to the rest of the system and towards the cameras. FIG. 14b is a Nomarski or differential interference contrast interferometer unit in which the Wollaston prism 613 produces the two orthogonally polarized beams which get collimated by microscope objective 616, hit the sample 617 at different locations, get reflected and recombined back upon traversing the Wollaston prism 613 and continue towards the imaging and phase retardation units 20 of FIG. 1. FIG. 14c is a polarized Fizeau interferometer in which the incident beam 621 is directed towards an optical flat 623. The top surface of optical flat 623 is anti-reflection coated while the bottom surface acts as a polarization beam splitter such as a wire grid polarizer or a stack of QWP/FBS/QWP. In the latter case the beam preferably linearly polarized and oriented at 45 degrees to the QWP optic axis. The bottom surface of the optical flat 623 has small spacers 4 in order to maintain a constant gap with the sample surface. Alternatively these small spacers may be removed and some proximity sensors can replace them. One linearly polarized beam gets reflected from the bottom surface of optical flat 623 while an orthogonally polarized beam is transmitted to sample 625 and get reflected. The two beams are recombined with beam splitter 622 and transmitted towards the imaging and phase retardation unit 2000 of FIG. 1.

FIG. 15: FIG. 15 shows a scheme for obtaining orthogonally polarized two beam interferometer in non-common path configurations (Linnik, Michelson and Twyman-Green interferometers) in which the illuminating light beam 701 first passes through a non-polarization beam splitter 702 and the interferometer uses a polarizing beam splitter 703 to generate the two orthogonally polarized beams. The two orthogonally polarized beams recombine in reflection at the PBS 703 and directed with BS 702 towards the imaging and phase retardation unit 2000 of FIG. 1.

DETAILED DESCRIPTION OF THE INVENTION

One of the main drawbacks of TD-FF-OCT imaging is that in order to obtain the OCT images few (typically 4) interference images usually have to be grabbed with each image phase shifted with respect to the others (typically by $\pi/2$). The OCT images are thus produced by a simple combination of these 4 interference images. Apart from the fact that this process reduces the available imaging speed by a factor of 4, it is also quite problematic since it requires great interferometer stability which is absolutely necessary for accurate phase and amplitude extraction of the interference signal. In the past, it was shown [45] that by using only three phase shifts, high resolution full field OCT images can be produced. The phase shifting was applied using a liquid crystal retarder (LCR) which had limited speed and accuracy. Also, this method required that the interferometer be very stable between successive phase shifted images. For an exact, fringeless, demodulation of the interference signal envelope, a very accurate and stable technique is required. In the present invention three cameras are used, each equipped with a preferably $\pi/2$, but not limited, phase shifted enface image. The phase shifted images are grabbed exactly at the same time and using very accurate achromatic wave plates so that air turbulences and phase mismatch errors are reduced to minimum.

The spatial coherence TD-FF-OCT signal of a single microstructure located within a weakly scattering medium (Eqs. 1-3) [45] are now considered. For simplicity the objective lenses are assumed to be used with index matching material.

$$I(x', y', \Delta z, \beta, \lambda) \approx I_0(x, y, \lambda) \quad (1)$$
$$\{R_{scat}(x, y) + R_R + R_S(x, y) +$$
$$2\sqrt{R_R R_S(x, y)} \, A[\Delta z - \ell(x, y), \lambda] \cos\{2\pi f_z[\Delta z - \ell(x, y)] + \beta\}\}$$

$$A[\Delta z - \ell(x, y), \lambda] = \text{sinc}\left\{\frac{n_0 NA^2 \pi}{\lambda}[\Delta z - \ell(x, y)]\right\} \quad (2)$$

$$f_z = \frac{n_0}{\lambda/2}(1 - NA^2/4) \quad (3)$$

For a typical Gaussian light source:

$$I_0(x, y, \lambda) = I_C(x, y)\exp[-(\lambda - \lambda_C)^2/2\sigma_\lambda^2] \quad (4)$$

$I_c(x, y)$ being the irradiance at the peak wavelength. Alternatively the light source can be flat or with any kind of spectral shape; in which case equation (4) is modified accordingly. Generally speaking, for uniform illumination $I_c$ is independent of the lateral sample location (x,y). The parameter $\lambda$ is the wavelength, $\lambda_c$ is the central wavelength (peak wavelength) of the source, $\sigma_\lambda$ is the source bandwidth (variance), NA is the numerical aperture of the objective lens, $n_0$ is the sample (and matching) refraction index, $\Delta_z$ is the scanning distance, l(x, y) is the distance of the microstructure from the focal plane which is coincident with the top surface of the sample at the beginning of the scan, $R_{scat}(x, y)$ is non-interfering back scattered field, $R_R$ is the reference mirror reflectivity and $R_s(x, y)$ is the sample reflectivity. The coordinates (x',y') are at the image plain and $\beta$ is the phase delay provided by the wave plates arrangements.

By providing three phase shifted images, each to a different CCD camera (see FIG. 1), the envelope and phase of the interference signal are obtained (see FIG. 6 for the simulation results). In the case of a narrow bandwidth the obtained signal is the so called spatial coherence gating OCT signal, see Equation 5.

$$I_{OCT,s}(x', y', \lambda) = [I(\beta = 0) - I(\beta = \pi)]^2 + \{2I(\beta = \pi/2) - \quad (5)$$
$$[I(\beta = 0) + I(\beta = \pi)]\}^2$$
$$= 16I_0^2(x, y, \lambda)R_R R_S(x, y)A^2[\Delta z - \ell(x, y), \lambda]$$

There are several ways to present the OCT images; the most common approach is the logarithmic scaling. Equation 5 is the so called linear display and equation 6 is the so called log scaling display:

$$I_{OCT,s}(x', y', \lambda) = 20\log\{16I_0^2(x, y, \lambda)R_R R_S(x, y)A^2[\Delta z - \ell(x, y), \lambda]\} \quad (6)$$

Note that if the temporal coherence contribution is to be considered (temporal coherence gating FFOCT), equation 5 should be integrated for the wavelength band to yield:

$$I_{OCT,t}(x', y') = \int_{\Delta\lambda} 16 I_0^2(x, y, \lambda) R_R R_S(x, y) A^2 [\Delta z - \ell(x, y), \lambda] d\lambda \quad (7)$$

(see FIG. 7 for the simulation results)

And in the case of logarithmic scaling equation 7 becomes:

$$I_{OCT,t}(x', y') = \quad (8)$$
$$20 \log \left\{ \int_{\Delta\lambda} 16 I_0^2(x, y, \lambda) R_R R_S(x, y) A^2 [\Delta z - \ell(x, y), \lambda] d\lambda \right\}$$

Another implementation of the method of the invention is to extract the phase of the interference signal. For example, the phase of the interference signal can be retrieved using equation 9:

$$tg\{\psi(x', y', \lambda)\} = \{[I(\beta = 0) + I(\beta = \pi)] - \quad (9)$$
$$2I(\beta = \pi/2)\} / [I(\beta = 0) - I(\beta = \pi)]$$
$$= tg\{2\pi f_z [\Delta z - \ell(x, y)]\}$$

Using the extracted phase, very accurate surface and depth profiling can be performed. See an exemplary experimental result in FIG. 12 and FIG. 13. Generally, when the phase difference between each signal is $m\pi < \beta < (m+1)\pi$ instead of $\pi/2$ as in eq. 9, the general equation for obtaining the phase is given by eq. 10:

$$\psi(x',y',\lambda) = tg^{-1}(tg(\beta/2)\{[I(0)-I(2\beta)]/[2I(\beta)-I(0)-I(2\beta)]\}) - \beta \quad (10)$$

Although to demonstrate the disclosed system and methodology the inventors concentrated on three phase shifted signals arriving to three detectors in parallel, it should be mentioned that its generalization to the case of any number (N>3) of phase shifted channels using the same number N of detectors in parallel is straightforward using phase shift extraction algorithms known in the art.

In many cases of OCT the sample reflectivity is significantly smaller than the reference mirror reflectivity. Under these circumstances equation 1 can be rewritten accordingly, as equation 11:

$$I(x',y',\Delta z,\beta,\lambda) \approx I_0(x,y,\lambda)\{R_R + 2\sqrt{R_R R_S(x,y)} A[\Delta z - \ell(x,y),\lambda] \cos\{2\pi f_z[\Delta z - \ell(x,y)] + \beta\}\} \quad (11)$$

In this case, the spatial coherence gate TD-FF-OCT signal can be obtained using only two cameras in accordance with the description of FIG. 2. The signal is obtained by first saving one image with only the reference arm imaged $I_R(x', y') \approx I_0(x, y, \lambda) R_R$. Then, by subtracting this image from each one of the full field interference images grabbed by the two cameras, the in phase and quadrature signals are obtained in parallel. By taking the square of these two signals the envelope of the interference signal is extracted, whereas by dividing these two signals the interference phase is obtained. The above description is formulated using equations 12 and 13:

$$I_{OCT,s}(x', y', \lambda) = [I(\beta = \pi) - I_R]^2 + [I(\beta = \pi/2) + I_R]^2 \quad (12)$$
$$\approx 4 I_0^2(x, y, \lambda) R_R R_S(x, y) A^2 [\Delta z - \ell(x, y), \lambda]$$

$$tg\{\psi(x', y', \lambda)\} = [I_R - I(\beta = \pi/2)] / [I_R - I(\beta = \pi)] \quad (13)$$
$$\approx tg\{2\pi f_z [\Delta z - \ell(x, y)]\}$$

In the case of temporal coherence gating TD-FF-OCT, equation 12 is integrated over the entire optical bandwidth in similar fashion of equation 7. Here too, the OCT signal may be presented using logarithmic, as well as linear, scaling.

As previously explained in the background section of this application, the FD-FF-OCT approach is the only method that does not require any form of scanning in order to obtain the 3D OCT images. As such, it has the potential to be the ultimate solution for high speed 3D OCT imaging. Referring now to FIG. 9, the interference field projected onto each pixel, at each parallel detector and in each wavelength/frequency is as follows, see equation 14:

$$\vec{E} = \left[ r_R E_0(k) \cos(\omega t - 2kf - 2kL_R - \beta_o) + \sum_m r_m E_0(k) \cos(\omega t - 2kz_m - 2kL_O - \beta_e) \right] \vec{n}_A \quad (14)$$

In equation 14 the reference and sample back reflected fields are interfered. The parameter $r_R$ is the reflectivity of the reference field, $E_0(k)$ is the field amplitude at any given wave number k, $\omega$ is the optical radial frequency, f is the focal length of the objective lenses, $L_R$ is the length of the reference arm, $r_m$ is the reflectivity of each microstructure in the sample, $z_m$ is the optical path length from the principle plain of the sample objective lens to the $m_{th}$ microstructure, $L_O$ is the length of the sample arm, $\beta = \beta_e - \beta_o$ is the retardation provided by the wave plates and $\vec{n}_A$ is a unit vector in the direction of the analyzers in front of the cameras. Equation 14 disregards any losses or non-ideal conditions set forth by the optical components comprising the system. In particular it disregards the losses due to splitting and polarizing at the different BS and analyzers. More specifically, equation 14 is derived using the following assumptions: (1) contributions of multiple reflections at the sample are negligible, (2) refraction at the sample is negligible due to the relatively low NA of objective lenses used, (3) reflection coefficients are very small as $n_m \sim n_{m+1} \sim n_{avg}$ (4) the depth of field of the objective lenses is large in comparison with the sample thickness, (5) the model disregards diffraction, and (6) the model assumes that the paraxial ray approximation holds. Also, for keeping the discussion as general as possible, it is assumed that each spectral line is coherent. When using LED with a tunable filter the spectral lines are not coherent and coherent noise is transformed into additional DC noise which is simpler to eliminate; this is the reason that each spectral line can be regarded as being purely coherent.

The incident irradiance at each pixel at each wavelength is given by the time average Poynting's vector, see equation 15:

$$\langle \vec{S} \rangle = \frac{1}{T} \int_{-T/2}^{T/2} \vec{S} dt = \langle E \times H \rangle = \frac{\langle |E|^2 \rangle}{\sqrt{\mu_0/\varepsilon_0}} \vec{n}_z \quad (15)$$
$$= \frac{\vec{n}_z}{Z_0} \langle |[r_R E_0(k) \cos(\omega t - 2kf - 2kLR - \beta_O) + $$

-continued $$\sum_m r_m E_0(k)\cos(\omega t - 2kz_m - 2kL_O - \beta_e)\Big]\vec{n}_A\Big|^2\Big\rangle$$

In equation 15, $\vec{S}$ is the Poynting's vector which reflects the provided power density of the propagating interfering fields, T is the time period of the optical wave, $\vec{E}$ is the interference electrical field of equation 14, $\vec{H}$ is the magnetic interference field, $\mu_0$ is the free space magnetic permeability, $\varepsilon_0$ is the free space dielectric permittivity and $\vec{n}_z$ is a unit vector in the direction of the propagation fields. Equation 14 is simplified using a simple trigonometric identity $$\cos\alpha_1\cos\alpha_2 = \frac{1}{2}[\cos(\alpha_1 - \alpha_2) + \cos(\alpha_1 + \alpha_2)]$$

as seen in equation 16:

$$\langle \vec{S} \rangle = \frac{E_0^2(k)(\vec{n})_z}{2Z_0} \times \left\{ r_R^2 + \sum_m r_m^2 + \sum_{m \neq n}\sum_n r_m r_n \cos(2kz_n - 2kz_m) + \right.$$
$$\left. 2\sum_m r_m r_R \cos\left[2kf - 2kz_m - 2k\overline{(L_O - L_R)} - \beta\right] \right\} \quad (16)$$

By taking the dot product of the unit vector of the detector surface and equation 16 the irradiance incident at each pixel of the sensor is obtained, see equation 17.

$$I = I_0(k)\left\{ \overbrace{r_R^2 + \sum_m r_m^2}^{DC(noise)} + \overbrace{\sum_{m \neq n}\sum_n r_m r_n \cos 2k(z_n - z_m)}^{AutoCorrolation\ (noise)} + \overbrace{2\sum_m r_m r_R \cos[2k(z_m - f) + \beta]}^{CrossCorrolation\ (signal)} \right\} \quad (17)$$

In equation 17 $I_0(k)$ has been substituted for $E_0^2(k)/2Z_0$ and d set equal to 0 for simplicity. In an effort to further simplify the method, a few more simple substitutions are made, namely: $k=2\pi v/c$, $z_m=\Delta z_m\bar{n}+f+\Delta z_1(1-\bar{n})$, $\tau_m=2\Delta z_m\bar{n}/c$, $\tau_0=2[\Delta z_1(1-\bar{n})+d]/c$, $\tau_{mn}=2(z_n-z_m)/c$ with $\Delta z_m$ being the thickness of the $m^{th}$ layer of the multilayer sample. Using these substitutions, equation 16 becomes equation 18.

$$I = I_0(v)\left\{ \overbrace{r_R^2 + \sum_m r_m^2}^{DC(noise)} + \overbrace{\sum_{m \neq n}\sum_n r_m r_n \cos 2\pi v \tau_{mn}}^{AutoCorrolation\ (noise)} + \overbrace{2\sum_m r_m r_R \cos[2\pi v(\tau_{mn} + \tau_0) + \beta]}^{CrossCorrolation\ (signal)} \right\} \quad (18)$$

Note that $\tau_m$ is positive for structures located after the zero delay line and negative for structure located before the zero delay line. Also, note that although the entire image is shifted by $\tau_0$, the distances between structures are not influenced by this shift. Therefore, the constant time shift can be disregarded by setting it to zero; as it has no influence on the total sample structure. Also note that for incoherent light source such as a LED, the autocorrelation term vanishes; the method of the invention is described using equation 17 to avoid any loss of generality in the case of a swept laser source.

In normal FD-FF-OCT, after recording interference images with different wavelengths, the 3D image is obtained by taking the inverse Fourier transform (IFT) of each pixel of the stored interference images. It is clear from equation 18 that an IFT operation of the equation results in what is usually termed by those familiar with the art as DC noise, autocorrelation noise and mirror image obscuring. In this invention a method and a system are disclosed that solves these problems using the system depicted in the figures and described herein above. For example, referring now to FIG. 2 and to FIG. 4, each camera is optionally equipped with $\pi/2$ phase difference provided by the wave plates arrangement and the polarimetric configuration of the Linnik/Twyman-Green/Michelson interferometers. Therefore, by using equation 19 the mirror image, the DC noise and the autocorrelation parasitic noise can be eliminated.

$$I = I_1(\beta_1 = 0) - I_3(\beta_3 = \pi) - j\{[I_1(\beta_1 = 0) + I_3(\beta_3 = \pi)] - \quad (19)$$
$$2I_2(\beta_2 = \pi/2)\}$$
$$= 4I_0(v)r_R \times \sum_m r_m\exp(-j2\pi v\tau_m)$$

Then, by taking the IFT of equation 19 the FD-FF-OCT signal is obtained with full range imaging and obscuring by mirror images, DC noise, as well as autocorrelation noise, are eliminated. See equation 20.

$$I_{OCT}(t) = \quad (20)$$
$$|IFT[I(v)]| = \left|4r_R \cdot i(t) \otimes \sum_m r_m\delta(t - \tau_m)\right| = 4r_R\sum_m r_m|i(t - \tau_m)|$$

In equation 20 the fact that the IFT of a complex phase is simply a shifted time impulse has been used. The IFT of the irradiance of the source is designated by i(t). From equation 20 it is clear that the resulting signal is a train of impulses shifted by a time delay $\tau_m$, which is typical to the location of the $m_{th}$ structure, and convolved with the IFT of the source spectra. Note that each time delay $\tau_m$ is easily interpreted into the sample axial morphology by using the previous substitution $\Delta z_m = c\tau_m/2\bar{n}$. As equation 20 is obtained at each point of the image of the sample, the 3D morphology of the sample has thus been obtained.

The above model doesn't take into account that the optical components are not ideal. For example, the beam splitters may not have exactly a 50/50 splitting ratio and may not have the same splitting ratio for each wavelength. Also, the analyzers may not be exactly oriented at 45 degrees to the axes of the wave plates. The retardation wave plates may not have exactly $\pi/2$ and $\pi$ phase retardation and do not have exactly the same delay for each wavelength. The transmission efficiency of the optical components, the collecting efficiency of the light source, as well as the quantum efficiency of the optical sensor, are not brought into consideration in equation 20. A detailed and accurate derivation of the output expression from this system should take into account the polarization transmission and reflection at each optical element and the exact retardation provided. The simulation results in FIG. 10 and FIG. 11, as well as the simulation results for the TD mode as depicted in FIG. 7 and FIG. 8, have taken into account all the above factors using the optical specifications provided by the manufacturers; demonstrating that the current invention is valid and can be very well realized.

Another important feature of the invention is depicted in FIG. 3 and FIG. 5 using only two cameras to obtain the full range FD-FF-OCT signal. In OCT the reflectivity of each microstructure is most often much smaller than the reflectivity of the reference mirror, that is $r_R \gg r_m$. Under these circumstances, equation 18 may be approximated accordingly, see equation 21:

$$I \approx I_0(v) \left\{ \overbrace{r_R^2}^{DC} + \overbrace{2\sum_m r_m r_R \cos[2\pi v(\tau_{mn} + \tau_0) + \beta]}^{signal} \right\} \quad (21)$$

By saving an image of the reference mirror only $I_R = I_0(v) r_R^2$, at each one of the illuminating wavelengths, the complex signal can be reconstructed accordingly, see equation 22:

$$I \approx I_R - I_1(\beta = \pi) - j[I_R - I_2(\beta = \pi/2)] \quad (22)$$
$$= 2I_0(v)r_R \times \sum_m r_m \exp(-j2\pi v \tau_m)$$

Then, by taking the IFT of equation 22, the FD-FF-OCT signal is obtained with complex conjugate ambiguity resolved.

Another embodiment of the invention uses the polarized Mirau common path interferometer. This interferometer is similar to the Mirau objective but with slight modification to allow integration into the system of the invention. FIG. 14a shows this common path interferometry unit that replaces the non-common path Linnik and Tywman-Green interferometers depicted on FIGS. 2-5. It is a modified Mirau type objective with the internal flat beam splitter (FBS) replaced with a flat polarized beam splitter such as a wire grid polarizer or a stack of QWP/FBS/QWP. This type of objective already exists in the prior art (see US2010/0309476 A1 and U.S. Pat. No. 8,072,610 B1) but in the present invention it is integrated with a parallel phase retardation imaging system in which the incident beam polarization is linearly polarized at 45 degrees to the axis of the flat polarized beam splitter. The light coming from the illuminator is directed with the ordinary non-polarizing beam splitter 601 towards the modified Mirau objective lens system 602, hits the flat PBS (e.g. wire grid polarizer) 603, splits into TE polarized beam towards the reference mirror 604 and into TM polarized beam towards the sample 605. The two beams then recombine in reflection and continue to the rest of the system to unit 2000 of FIG. 1 or starting from component 133, 233, 333 and 433 in FIGS. 2-5, respectively.

Another preferred embodiment is depicted in FIG. 14b in which a Nomarski or differential interference contrast interferometer unit is shown. The Wollaston prism 613 produces the two orthogonally polarized beams, which are collimated by microscope objective 616, hit the sample 617 at different locations, are reflected and recombined back upon traversing the Wollaston prism 613 in the opposite direction and continue towards the imaging and phase retardation units 2000 of FIG. 1 or starting from component 133, 233, 333 and 433 in FIGS. 2-5, respectively.

Another embodiment is shown in FIG. 14c, which consists of a polarized Fizeau interferometer in which the incident beam 621 is directed towards an optical flat 623. The top surface of optical flat 623 is anti-reflection coated while the bottom surface acts as a polarization beam splitter such as a wire grid polarizer or a stack of QWP/FBS/QWP. In the latter case the beam preferably linearly polarized and oriented at 45 degrees to the QWP optic axis. The bottom surface of the optical flat 623 optionally has small spacers 624 in order to maintain a constant gap with the sample surface. Alternatively these small spacers maybe removed and optionally some proximity sensors can replace them. One linearly polarized beam gets reflected from the bottom surface of optical flat 623 while an orthogonally polarized beam is transmitted to sample 625 and gets reflected. The two beams are recombined with beam splitter 622 and transmitted towards the imaging and phase retardation unit 2000 of FIG. 1.

Another preferred embodiment uses the orthogonally polarized interferometer described in FIG. 15. The orthogonally polarized two beam interferometers in this case are non-common path configurations (Linnik, Michelson and Twyman-Green interferometers) in which the illuminating light beam 701 first passes through a non-polarization beam splitter 702 while the interferometer uses a polarizing beam splitter 703 to generate the two orthogonally polarized beams. The two orthogonally polarized beams recombine in reflection at the PBS 703 and directed with the non-polarizing BS 702 towards the imaging and phase retardation unit.

Another important embodiment of the invention is an interferometric microscopy unit built based on the same concepts described before but with the detectors replaced by three photodiodes or any other fast detectors, made of single pixel or multiple pixels. This embodiment is important for dynamically monitoring the position of a moving stage carrying a sample with high precision such as to help maintain the sample at the focal plane of an imaging system.

Another important embodiment of the invention is to convert the system into a multimodal imaging system. For this purpose the incident polarized light from the illumination unit 1700 is rotated, mechanically or electronically using an electrooptic or a magnetooptic modulator, so that the whole beam is forwarded towards the sample arm of the interferometer unit and nothing is transferred to the reference arm. This way a bright field imaging mode is produced and multimodal operation of the microscope system becomes possible such as fluorescence, dark field, and phase contrast, in addition to the 3D interference microscopy mode. Another option is to rotate the incident polarization from the illumination unit 1700 so that the intensity reflected from the reference mirror matches the intensity reflected from the sample to obtain optimum contrast.

Producing the Phase Shift

The phase shifts between the three cameras are produced in the present invention by using two slightly different approaches to arranging the wave-plates.

First Approach:

In the first approach element 33, 133, 233, 333 and 433 in FIGS. 1-5, respectively, is used as a zero retardation wave plate, that is, the element has no effect on the interference signal emerging from the Linnik interferometer and thus can be even completely excluded from the setup. In this case, the analyzers in front of the cameras are aligned at 45° with respect to the S and P polarization directions while the optic axes of the retardation wave plates are parallel to the S and P polarization directions of the waves emerging the interferometer. As a result, an achromatic phase shift is produced between the three cameras; a zero phase shift is generated at the camera which is equipped with the compensating retardation wave plate, a π/2 phase shift is introduced in the interference signal generated in the camera which is equipped with the precision achromatic quarter wave plate (PQWP) and a π phase shift is introduced in the interference signal generated in the camera which is equipped with the precision achromatic half wave plate (PHWP). Alternatively, instead of a π/2 phase shifts, the phase shifts between the cameras is β where mπ<β<(m+1)π and m is an integer, Second Approach In the second approach the wave plates 22, 28 and 25 in the detection unit 2000 of FIG. 1 and their respective designations in FIGS. 2-5 are completely excluded from the setup while element 33, 133, 233, 333 and 433 in FIGS. 1-5, respectively, is used as a PQWP retardation wave plate, which is rotated at 45° with respect to the S and P polarization waves emerging from the interferometer. As a result, the incident S and P linear polarization waves are converted into circular polarization waves with left and right handedness LH and RH, respectively. The two circular polarization waves are collected by the tube lens, then split by the beam splitters, then linearly polarized by the analyzers and finally projected onto the camera image plane. The analyzers are preferably aligned in 0°, 45° and 90° with respect to the S and P linear polarization original directions. As a result, a phase shift of 0 retardation is introduced in the interference signal generated in the camera equipped with the analyzer that is rotated by 0°, whereas a π/2 retardation is generated at the interference signal recorded by the camera equipped with the analyzer that is rotated in 45° and a π retardation is generated at the interference signal recorded by the camera equipped with the analyzer that is rotated in 90°. Alternatively, instead of a 45° analyzer rotation shifts, the rotation shifts are made by α where mπ/2<α<π(m+1)/2 and m is an integer. Note that this approach is sometimes preferable because there is no need for the retardation wave plates which are located between the non-polarizing beam splitters and the cameras [46]. Reference: [S. Suja Helen, M. P. Kothiyal, R. S. Sirohi, Achromatic phase shifting by a rotating polarizer, Optics Communications 154, 1998, 249-254]

To further clarify this issue the Jones matrices formalism is now used to show how the phase shift is generated. Consider the Jones vectors of RH and LH circularly polarized waves which represent the circular waves exiting the PQWP positioned in front of the tube lens (element 33, 133, 233, 333 and 433 in FIGS. 1-5):

$$E_{RH} = \frac{1}{\sqrt{2}}\begin{pmatrix} 1 \\ -i \end{pmatrix} \exp(i\phi_1) \qquad (23)$$

$$E_{LH} = \frac{1}{\sqrt{2}}\begin{pmatrix} 1 \\ i \end{pmatrix} \exp(i\phi_2) \qquad (24)$$

In equations 23-24, $\phi_1$ and $\phi_2$ are the phases of the optical waves coming from the reference and sample arms of the interferometer. After the circular waves split at the beam splitters, they are incident on a linear polarizer which is rotated at an angle α where α is preferably 0, 45 or 90 degrees. The Jones matrix is now written for an analyzer rotated at α degrees with respect to the P polarization direction:

$$P(\alpha) = \begin{pmatrix} \cos^2\alpha & \cos\alpha\sin\alpha \\ \cos\alpha\sin\alpha & \sin^2\alpha \end{pmatrix} \qquad (25)$$

The RH circular polarization wave transmitted through the analyzer is then expressed using the Jones calculus formalism, giving:

$$E_{RH,out} = P(\alpha)E_{RH} = \begin{pmatrix} \cos^2\alpha & \cos\alpha\sin\alpha \\ \cos\alpha\sin\alpha & \sin^2\alpha \end{pmatrix} \frac{1}{\sqrt{2}}\begin{pmatrix} 1 \\ -i \end{pmatrix} \exp(i\phi_1) \qquad (26)$$

$$E_{RH,out} = \frac{1}{\sqrt{2}}\begin{pmatrix} \cos\alpha \\ \sin\alpha \end{pmatrix} \exp[i(\phi_1 + \alpha)]$$

Similarly, the LH circular polarization wave is:

$$E_{LH,out} = \frac{1}{\sqrt{2}}\begin{pmatrix} \cos\alpha \\ \sin\alpha \end{pmatrix} \exp[i(\phi_2 + \alpha)] \qquad (27)$$

Clearly, the phase delay introduced between the reference and sample waves is directly related to the rotation angle of the analyzer:

$$\Delta\varphi = \angle E_{LH,out} - \angle E_{RH,out} = \phi_2 - \phi_1 + 2\alpha = \Delta\phi + \beta \qquad (28)$$

The constant phase delay Δφ appears common to all the interference signals, which are produced at the different cameras, while the β phase delay is different in each camera. For the camera equipped with the analyzer that is rotated at α=0°, the phase delay is β=0. For the camera equipped with the analyzer that is rotated at α=45°, the phase delay is β=2α=90°=π/2 rad. For the camera equipped with the analyzer that is rotated at α=90°, the phase delay is β=2α=180°=π rad.

Although embodiments of the invention have been described by way of illustration, it will be understood that the invention may be carried out with many variations, modifications, and adaptations, without exceeding the scope of the claims.

BIBLIOGRAPHY

1. D. Huang, E. A. Swanson, C. P. Lin, J. S. Schuman, W. G. Stinson, W. Chang, M. R. Hee, T. Flotte, K. Gregory, C. A. Puliafito, J. G. Fujimoto, "Optical Coherence Tomography", Science, 254, 1178-1181 (1991).
2. P. H Tomlins and R. K Wang, "Theory, developments and applications of optical coherence tomography," J. Phys. D: Appl. Phys. 38, 2519-2535 (2005).
3. A. F. Frecher, C. K. Hitzenberger, G. Kamp, S. Y. El-Zaiat, Opt. Commun., 117, 43-48 (1995).
4. F. Lexer, C. K. Hitzenberger, A. F. Frecher, M. Kulhavy, Appl. Opt., 36, 6548-6553 (1997).
5. R. Leitgeb, C. K. Hitzenberger, A. F. Frecher, Opt. Express., 11, 889-894 (2003).
6. Johannes F. de Boer, Barry Cense, B. Hyle Park, Mark C. Pierce, Guillermo J. Tearney, and Brett E. Bouma, "Improved signal-to-noise ratio in spectral-domain compared with time-domain optical coherence tomography", Opt. Lett., 28, 2067-2069 (2003).
7. M. A. Choma, M. V. Sarunic, C. Yang, J. A. Izatt, Opt. Express. 11, 2183-2189 (2003).
8. W. Drexler, U. Morgner, F. X. Kartner, C. Pitris, S. A. Boppart, X. D. Li, E. P. Ippen, and J. G. Fujimoto, "A vivo ultrahigh-resolution optical coherence tomography", Opt. Lett., 24, 1221-1223 (1999).
9. B. Povazay, K. Bizheva, A. Unterhuber, B. Hermann, H. Sattmann, A. F. Fercher, and W. Drexler, A. Apolonski, W. J. Wadsworth, J. C. Knight, and P. St. J. Russell, M. Vetterlein and E. Scherzer "Submicrometer axial resolution optical coherence tomography", Opt. Lett. 27, 1800-1802 (2002).
10. E. Beaurepaire, A. C. Boccara, M. Lebec, L. Blanchot, and H. Saint-Jalmes, "Full-field optical coherence microscopy," Opt. Lett. 23, 244-246 (1998).
11. L. Vabre, A. Dubois and A. C. Boccara, "Thermal-light full-field optical coherence tomography", Opt. Lett., 27, 530-532 (2002).
12. A. Dubois, K. Grieve, G. Moneron, R. Lecaque, L. Vabre and C. Boccara, "Ultrahigh-resolution full-field optical coherence tomography", App. Opt., 43, 2674-2883 (2004).
13. B. Povazay, A. Unterhuber, B. Hermann, H. Sattmann, H. Arthaber, W. Drexler "Full-field time-encoded frequency-domain optical coherence tomography", Opt. Exp., 14, 7662-7669 (2006).
14. S. K. Dubey, T. Anna, C. Shakher, D. S. Mehta, "Fingerprint detection using full-field swept-source optical coherence tomography", App. Phs. Lett., 91, 181106-181106-3 (2007).
15. S. K. Dubey, D. S. Mehta, A. Anand, C. Shakher, "Simultaneous topography and tomography of latent fingerprints using full-field swept-source optical coherence tomography", J. Opt. A, 10, 015307 (2008).
16. T. Bonin, G. Franke, M. H. Eggert, P. Koch, G. Hüttmann1, "In vivo Fourier-domain full-field OCT of the human retina with 1.5 million A-lines/s", Opt. Lett., 35, 3432-3434 (2010).
17. B. E. Bouma, G. J. Tearney, "Handbook of Optical Coherence Tomography", Marcel Dekker (2002).
18. Y. Watanabe, M. Sato "Three-dimensional wide-field optical coherence tomography using an ultrahigh-speed CMOS camera", Opt. Comm., 281, 1889-1895 (2008).
19. L. Vabre, A. Dubois, A. C. Boccara, "Thermal-light full-field optical coherence tomography", Opt. Lett., 27, 530-532 (2002).
20. A. Dubois, L. Vabre, A. C. Boccara, E. Beaurepaire, "High-resolution full-field optical coherence tomography with a Linnik microscope", App. Opt., 41, 805-812 (2002).
21. M. Akiba, K. P. Chan, and N. Tanno, "Full-field optical coherence tomography by two-dimensional heterodyne detection with a pair of CCD cameras", Opt. Lett., 28, 816-818 (2003).
22. G. Moneron, A. C. Boccara, and A. Dubois, "Stroboscopic ultrahigh-resolution full-field optical coherence tomography", Opt. Lett., 30, 1351-1353 (2005).
23. M. Wojtkowski, A. Kowalczyk, R. Leitgeb, A. F. Frecher, Opt. Lett., 27, 1415-1417 (2002).
24. P. Targowski, M. Wojtkowski, A. Kowalczyk, T. Bajraszewski, M. Szkulmowski, I. Gorczynska, Opt. Commun., 229, 79-84 (2004).
25. R. A. Leitgeb, C. K. Hitzenberger, A. F. Frecher, T. Bajraszewski, Opt. Lett., 28, 2201-2203 (2003).
26. S. H. Yun, G. J. Tearney, J. F. de Boer, and B. E. Bouma, Opt. Express, 12, 4822-4828 (2004).
27. A. H. Bachmann, R. A. Leitgeb, T. Lasser, Opt. Express, 14, 1487-1496 (2006).
28. Y. Yasuno, S. Makita, T. Endo, G. Aoki, H. Sumimura, M. Itoh, T. Yatagai, Opt. Express, 12, 6148-6191 (2004).
29. M. V. Sarunic, M. A. Choma, C. Yang, J. A. Izatt, Opt. Express, 13, 957-967 (2005).
30. B. J. Vakoc, S. H. Yun, G. J. Tearney, B. E. Bouma, Opt. Lett. 31, 362-364 (2006).
31. A. B. Vakhtin, K. A. Peterson, D. J. Kane, Opt. Lett. 31, 1271-1273 (2006).
32. Y. Yasuno, S. Makita, T. Endo, G. Aoki, M. Itoh, T. Yatagai, Appl. Opt. 45, 1861-1865 (2006).
33. R. K. Wanga, Appl. Phys. Lett., 90, 54103 (2007).
34. B. Baumann, M. Pircher, E. Gotzinger, C. K. Hitzenberger, Opt. Express, 15, 13375-13387 (2007).
35. R. A. Leitgeb, R. Michaely, T. Lasser, S. C. Sekhar, Opt. Lett., 32, 3453-3455 (2007).
36. S. Vergnole, G. Lamouche, M. L. Dufour, 33, 732-734 (2008).
37. B. Hofer, B. Povazay, B. Hermann, A. Unterhuber, G. Matz, W. Drexler, Opt. Express, 17, 7-24 (2009).
38. A. Dhalla, J. A. Izatt, Opt. Express, 2, 1218-1232 (2011).
39. W. Krug, J. Rienitz and G. Schultz (eds), *Contributions to Interference Microscopy* (Hilger and Watts, London 1964).
40. M. Davidson, K. Kaufman, I. Mazor, and F. Cohen, "An application of interference microscopy to integrated circuit inspection and metrology," in *Integrated Circuit Metrology, Inspection, and Process Control*, K. M. Monahan, ed., Proc. SPIE 775, 233-247 (1987).
41. G. S. Kino and S. S. C. Chim, "Mirau correlation microscope," App. Opt. 29, 3775-3783 (1990).
42. D. Gale, M. I. Pether, and J. C. Dainty, "Linnik microscope imaging of integrated circuit structures," Appl. Opt. 35, 131-148 (1996).
43. M. Kinoshita, M. Takeda, H. Yago, Y. Watanable, and T. Kurokawa, "Optical frequency-domain imaging microprofilometry with a frequency-tunable liquid-crystal Fabry-Perot etalon device," Appl. Opt. 38, 7063-7068 (1999).
44. P. de Groot, X. Colonna de Lega, "Signal modeling for low-coherence height-scanning interference microscopy," Appl. Opt. 43, 4821-4830 (2004).
45. A. Safrani, I. Abdulhalim, "Ultrahigh-resolution full-field optical coherence tomography using spatial coherence gating and quasi-monochromatic illumination", Opt. Lett., 37, 458-460 (2012).
46. S. Suja Helen, M. P. Kothiyal, R. S. Sirohi, Achromatic phase shifting by a rotating polarizer, Optics Communications 154, 1998, 249-254

The invention claimed is:
1. An interference microscopy 3D imaging system comprising:
   a. an illumination unit, which provides light to the system;
   b. a frequency domain triggering unit, which accepts light from illumination unit and allows triggering of detectors in a frequency domain operating mode;
   c. a two beam orthogonally polarized interferometer, which is illuminated by light from illumination unit and;
   d. a detection unit comprising:
      i. a tube lens;
      ii. at least three 50/50 non-polarizing beam splitters;
      iii. at least two analyzers;
      iv. at least two parallel detectors; and v. at least one precision achromatic wave plate chosen from at least one of the following types of wave plates: compensating, half wave, and quarter wave; and e. a motorized stage on which the sample is mounted, the motorized stage connected to and controlled by a processing unit;

wherein the interference microscopy 3D imaging system allows at least two full field achromatic phase shifted interference signals to be captured simultaneously and processed to yield an amplitude signal and a phase signal thereby allowing ultra-high speed, accurate 3D imaging with great immunity to vibrational and intensity noise;

wherein the two beam orthogonally polarized interferometer has the configuration of one of the following interferometer types: Linnik, Michelson, Twyman-Green, Fizau, Nomarski and Mirau.

2. The interference microscopy 3D imaging system of claim 1, wherein the detection unit 2000 comprises:
   i. a tube lens;
   ii. a first 50/50 non-polarizing beam splitter, a second 50/50 non-polarizing beam splitter and a third 50/50 non-polarizing beam splitter by which the interferometer output beam is split and manipulated in space;
   iii. a precision achromatic compensating wave plate aligned with its optic axis parallel to the S or P waves emerging from the interferometer;
   iv. a precision achromatic quarter wave plate aligned with its optic axis parallel to the S or P waves emerging from the interferometer;
   v. a precision achromatic half wave plate aligned with its optic axis parallel to the S or P waves emerging from the interferometer;
   vi. three analyzers positioned after the wave plates at 45° with respect to the S and P waves; and
   vii. three parallel detectors used to detect the interference images.

3. The interference microscopy 3D imaging system of claim 2, wherein the light emerging from the illumination unit is quasi-monochromatic, the plates are not-achromatic, the parallel detectors are single pixel detectors and the phase extracted is fed into a motion control to dynamically monitor the position of a moving stage carrying a sample.

4. The interference microscopy 3D imaging system of claim 1, wherein the detection unit comprises:
   i. a precision achromatic quarter wave plate aligned with its optic axes at 45° with respect to the S and P waves emerging from the interferometer;
   ii. a tube lens;
   iii. a first 50/50 non-polarizing beam splitter, a second 50/50 non-polarizing beam splitter and a third 50/50 non-polarizing beam splitter by which the interferometer output beam is split and manipulated in space;
   iv. three analyzers positioned at 0°, 45°, and 90° with respect to the S and P waves emerging from the interferometer; and
   v. three parallel detectors positioned after the analyzers and used to detect the interference images.

5. The interference microscopy 3D imaging system of claim 4, wherein the light emerging from the illumination unit is quasi-monochromatic, the plate is not-achromatic, the parallel detectors are single pixel detectors and the phase extracted is fed into a motion control to dynamically monitor the position of a moving stage carrying a sample.

6. The interference microscopy 3D imaging system of claim 1, wherein the detection unit comprises:
   i. a tube lens;
   ii. a first 50/50 non-polarizing beam splitter, a second 50/50 non-polarizing beam splitter and a third 50/50 non-polarizing beam splitter by which the interferometer output beam is split and manipulated in space;
   iii. a precision achromatic quarter wave plate aligned with its optic axis parallel to the S or P waves emerging from the interferometer;
   iv. a precision achromatic half wave plate aligned with its optic axis parallel to the S or P waves emerging from the interferometer;
   v. two analyzers positioned after the wave plates at 45° with respect to the S and P waves; and
   vi. two parallel detectors used to detect the interference images.

7. The interference microscopy 3D imaging system of claim 6, wherein the light emerging from the illumination unit is quasi-monochromatic, the plates are not-achromatic, the parallel detectors are single pixel detectors and the phase extracted is fed into a motion control to dynamically monitor the position of a moving stage carrying a sample.

8. The interference microscopy 3D imaging system of claim 1, wherein the detection unit comprises:
   i. a precision achromatic quarter wave plate aligned with its optic axes at 45° with respect to the S and P waves emerging from the interferometer;
   ii. a tube lens;
   iii. a first 50/50 non-polarizing beam splitter, a second 50/50 non-polarizing beam splitter and a third 50/50 non-polarizing beam splitter by which the interferometer output beam is split and manipulated in space;
   iv. two analyzers positioned at 45° and 90° with respect to the S and P waves emerging from the interferometer; and
   v. two parallel detectors positioned after the analyzers and used to detect the interference images.

9. The interference microscopy 3D imaging system of claim 8, wherein the light emerging from the illumination unit is quasi-monochromatic, the plate is not-achromatic, the parallel detectors are single pixel detectors and the phase extracted is fed into a motion control to dynamically monitor the position of a moving stage carrying a sample.

10. The interference microscopy 3D imaging system of claim 1, wherein the illumination unit comprises at least one of the following elements: a tunable light source, a non-tunable light source, a diffuser, a condensing lens, a field stop, a projecting lens, a polarizer, a tunable filter, and a non-polarizing beam splitter.

11. The interference microscopy 3D imaging system of claim 10, wherein the light source is one of: a laser, laser configured to allow wavelength sweeping, a light emitting diode, a white light source, and a non-tunable light source with an integrated tunable filter.

12. The interference microscopy 3D imaging system of claim 1, wherein the incident polarization from the illumination unit is rotated so that the intensity reflected from the reference mirror matches the intensity reflected from the sample to obtain optimum contrast.

13. The interference microscopy 3D imaging system of claim 1, wherein the amplitude signal is used to bring the focus plane onto the surface of one particular layer of a thick multilayered sample while the phase signal is used to map the surface of that particular layer.

14. The interference microscopy system of claim 1, wherein the introduced interference phase shifts using the wave plates is $\beta$ rather than $\pi/2$ where $\pi m <\beta<\pi (m+1)$ and m is an integer.

* * * * *